United States Patent
Berlin et al.

(10) Patent No.: US 9,780,841 B2
(45) Date of Patent: Oct. 3, 2017

(54) DISTRIBUTED ANTENNA SYSTEMS (DAS) SUPPORTING EXPANDED, PROGRAMMABLE COMMUNICATIONS SERVICES DISTRIBUTION TO PROGRAMMABLE REMOTE COMMUNICATIONS SERVICE SECTOR AREAS

(71) Applicant: Corning Optical Communications Wireless Ltd, Airport City (IL)

(72) Inventors: Igor Berlin, Potomac, MD (US); Dror Harel, Hod Hasharon (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 0 days.

(21) Appl. No.: 15/236,645

(22) Filed: Aug. 15, 2016

(65) Prior Publication Data

US 2016/0352393 A1 Dec. 1, 2016

Related U.S. Application Data

(63) Continuation of application No. PCT/IL2015/050217, filed on Feb. 26, 2015.
(Continued)

(51) Int. Cl.
*H04B 7/02* (2017.01)
*H04B 10/00* (2013.01)
(Continued)

(52) U.S. Cl.
CPC ....... *H04B 7/022* (2013.01); *H04B 10/25753* (2013.01); *H04B 10/807* (2013.01); *H04W 88/085* (2013.01)

(58) Field of Classification Search
CPC .................... H04B 10/25753; H04B 7/022
(Continued)

(56) References Cited

U.S. PATENT DOCUMENTS

| 5,852,651 A | 12/1998 | Fischer et al. |
| 6,308,085 B1 | 10/2001 | Shoki |

(Continued)

FOREIGN PATENT DOCUMENTS

WO 2013009835 A1 1/2013

OTHER PUBLICATIONS

ADC "Event-Driven Mobile Communications Systems Best Practices", Article; www.adc.com, Oct. 2010.
(Continued)

*Primary Examiner* — Daniel Washburn
*Assistant Examiner* — Sarah Hassan
(74) *Attorney, Agent, or Firm* — C. Keith Montgomery

(57) ABSTRACT

Embodiments disclosed herein include distributed antenna systems (DASs) supporting expanded, programmable communications services distribution to remote communications service sector areas. In one embodiment, the DAS includes a first programmable switch for distributing downlink communications signals into one or more communications service sector sets. The DAS further includes a second programmable switch configured to distribute the one or more communications service sector sets to one or more remote communications service sector areas. A configurable extender module is also included to provide expanded routing of communications service sector sets in the DAS. In this manner, the DAS is programmable to allow any combination of communications service sector sets and expanded communications service sector sets from any number of different base stations to be routed to any combination of remote communications service sector areas and (Continued)

expanded remote communications service sector areas, based on capacity needs and capability of the DAS.

26 Claims, 12 Drawing Sheets

Related U.S. Application Data

(60) Provisional application No. 61/944,745, filed on Feb. 26, 2014.

(51) Int. Cl.
*H04B 7/022* (2017.01)
*H04B 10/80* (2013.01)
*H04B 10/2575* (2013.01)
*H04W 88/08* (2009.01)

(58) Field of Classification Search
USPC .......................................... 375/267; 398/116
See application file for complete search history.

(56) References Cited

U.S. PATENT DOCUMENTS

| | | | |
|---|---|---|---|
| 6,696,917 B1 | 2/2004 | Heitner et al. | |
| 7,286,507 B1* | 10/2007 | Oh ........................ | H04W 16/26 370/312 |
| 7,336,961 B1* | 2/2008 | Ngan ..................... | H04W 64/00 455/140 |
| 7,627,250 B2 | 12/2009 | George et al. | |
| 7,715,722 B1 | 5/2010 | Hoke et al. | |
| 8,121,646 B2 | 2/2012 | Oren et al. | |
| 8,254,848 B1* | 8/2012 | Elliott ................... | H04B 7/022 370/242 |
| 8,310,963 B2 | 11/2012 | Singh | |
| 8,532,492 B2 | 9/2013 | Palanisamy et al. | |
| 8,649,684 B2 | 2/2014 | Casterline et al. | |
| 2002/0075906 A1 | 6/2002 | Cole et al. | |
| 2004/0203704 A1 | 10/2004 | Ommodt et al. | |
| 2005/0157675 A1* | 7/2005 | Feder ..................... | H04W 4/04 370/328 |
| 2005/0226625 A1 | 10/2005 | Wake et al. | |
| 2006/0045054 A1 | 3/2006 | Utsumi et al. | |
| 2006/0084379 A1* | 4/2006 | O'Neill .............. | H04B 7/15535 455/25 |
| 2007/0286599 A1 | 12/2007 | Sauer et al. | |
| 2008/0145056 A1 | 6/2008 | Boldi et al. | |
| 2008/0166094 A1 | 7/2008 | Bookbinder et al. | |
| 2009/0169163 A1 | 7/2009 | Abbott, III et al. | |
| 2009/0180407 A1 | 7/2009 | Sabat et al. | |
| 2009/0316609 A1 | 12/2009 | Singh | |
| 2010/0177759 A1* | 7/2010 | Fischer ............... | H04W 88/085 370/345 |
| 2011/0008042 A1 | 1/2011 | Stewart | |
| 2011/0122769 A1* | 5/2011 | Zhang ..................... | H04B 3/54 370/235 |
| 2011/0135308 A1 | 6/2011 | Tarlazzi et al. | |
| 2011/0141895 A1* | 6/2011 | Zhang .................... | H04L 12/66 370/235 |
| 2011/0227678 A1 | 9/2011 | Cruickshank et al. | |
| 2011/0268446 A1 | 11/2011 | Cune et al. | |
| 2011/0268449 A1 | 11/2011 | Berlin et al. | |
| 2012/0087670 A1 | 4/2012 | Han et al. | |
| 2012/0281565 A1* | 11/2012 | Sauer .................... | H04W 64/00 370/252 |

OTHER PUBLICATIONS

Seifi et al; "Downlink Performance and Capacity of Distributed Antenna Systems Based on Realistic Channel Model"; IEEE; 2008: pp. 249-253.
Zhang et al: "Energy-Efficient Uplink Transmission in Sectorized Distributed Antenna Systems"; IEEE 2010: 5 Pages.
Patent Cooperation Treaty, International Search Report for Application No. PCT/IL2015/050217, dated Jun. 12, 2015, 11 pages.

* cited by examiner

110

| 83(1) | 96D(3) |
| | 96D(E)(3)(1) |
| 83(2) | 96D(2) |
| | 96D(E)(2)(1) |
| 83(3) | 96D(1) + 96D(3) |
| | 96D(E)(1)(1) + 96D(E)(3)(1) |

FIG. 7

DISTRIBUTED ANTENNA SYSTEMS (DAS) SUPPORTING EXPANDED, PROGRAMMABLE COMMUNICATIONS SERVICES DISTRIBUTION TO PROGRAMMABLE REMOTE COMMUNICATIONS SERVICE SECTOR AREAS

PRIORITY APPLICATION

This application is a continuation of International Patent Application No. PCT/IL2015/050217 filed on Feb. 26, 2015 which claims the benefit of priority to U.S. Provisional Application 61/944,745 filed on Feb. 26, 2014, both applications being incorporated herein by reference by reference.

RELATED APPLICATION

The present application is related to U.S. patent application Ser. No. 12/914,585 filed on Oct. 28, 2010 and entitled "Sectorization In Distributed Antenna Systems, and Related Components and Methods," which is incorporated herein by reference in its entirety.

BACKGROUND

The technology of the present disclosure relates generally to distributed antenna systems (DASs) that support distributing communications services to remote antenna units, and particularly to supporting programmable remote communications service sector areas.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N). The remote antenna units 14(1)-14(N) are also configured to receive uplink communications signals 20U from the client devices 26 in their respective coverage areas 10(1)-10(N) to be distributed to the base station 18. The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed RF receiver sensitivity, so that the above-mentioned properties of the remote antenna units 14(1)-14(N) mainly determine the size of their respective remote coverage areas 10(1)-10(N).

The DAS 12 in FIG. 1 may also be provided in an indoor environment, as illustrated in FIG. 2. FIG. 2 is a partially schematic cut-away diagram of a building infrastructure 28 employing the DAS 12. The building infrastructure 28 in this embodiment includes a first (ground) floor 30(1), a second floor 30(2), and a third floor 30(3). The floors 30(1)-30(3) are serviced by the central unit 16 to provide the antenna coverage areas 10 in the building infrastructure 28. The central unit 16 is communicatively coupled to the base station 18 to receive downlink communications signals 20D from the base station 18. The central unit 16 is communicatively coupled to the remote antenna units 14 to receive the uplink communications signals 20U from the remote antenna units 14, as previously discussed above. The downlink and uplink communications signals 20D, 20U communicated between the central unit 16 and the remote antenna units 14 are carried over a riser cable 32. The riser cable 32 may be routed through interconnect units (ICUs) 34(1)-34(3) dedicated to each floor 30(1)-30(3) that route the downlink and uplink communications signals 20D, 20U to the remote antenna units 14 and also provide power to the remote antenna units 14 via array cables 36(1)-36(6).

The DAS 12 in FIGS. 1 and 2 has a given capacity. In other words, the DAS 12 is configured to support a given number of client devices 26 and an overall data rate for the downlink and uplink communications signals 20D, 20U. This capacity is based on the capacity of the equipment provided in the DAS 12 and the base station 18. As the popularity of client devices continues to increase, the number of client devices 26 that may need to be supported by the DAS 12 may also increase. Further, as technology progresses, the average data rate demand per client device 26 is also likely to increase. To satisfy these increased capacity demands, the DAS 12 may be configured to provide additional capacity beyond the capacity need when the DAS 12 is initially installed. However, this provides an inefficient use of resources in the DAS 12 that may not be utilized for some time to come. However, if the initial capacity of the DAS 12 is limited to the initial capacity requirements, the equipment in the DAS 12 will need to be upgraded and/or replaced to support additional capacity requirements in the future. Further, the capacity demands in certain remote coverage areas 10 in the DAS 12 may be greater than in other remote coverage areas 10. If the capacity of the DAS 12 is increased to respond to the remote coverage areas 10 with increased capacity requirements, other remote coverage areas 10 that do not require the increased capacity are also provided with increased capacity, which can affect the DAS's 12 ability to provide increased capacity to targeted remote coverage areas 10.

No admission is made that any reference cited herein constitutes prior art. Applicant expressly reserves the right to challenge the accuracy and pertinency of any cited documents.

SUMMARY

Embodiments disclosed herein include distributed antenna systems (DASs) supporting expanded, programmable communications services distribution to remote communications service sector areas. Related devices and methods are also disclosed. In one embodiment, the DAS is configured to receive downlink communications signals for one or more communications services from one or more base stations. The communications services can include voice and non-voice data, as non-limiting examples. The DAS includes a first programmable switch for distributing the downlink communications signals into one or more communications service sector sets, which are sets or subsets of all received communications services, according to a programmable configuration for the first configurable switch. The DAS further includes a second programmable switch configured to distribute the one or more communications service sector sets to one or more remote antenna unit groupings to form one or more remote communications service sector areas, according to a programmable configuration for the second configurable switch. In this manner, as an example, the DAS can be programmed and expanded to distribute the desired communications service sector set or sets to the desired remote communications service sector area or areas, based on the capacity needs and capacity capability of the DAS. The communications service sector set may also be defined as a communications sub-service since it may include a subset of the communications services distributed by the DAS.

For example, if more coverage areas are desired to be provided in the DAS for a given communications service, the first and second programmable switches in the DAS can be programmed or reprogrammed to provide such communications services to additional remote communications service sector areas. As another example, if it is desired to provide greater capacity at a given remote communications service sector area in the DAS, the first and second programmable switches in the DAS can be programmed or reprogrammed for another communications service or services to be distributed to the remote communications service sector area to make use of the capacity of the communication service sector set at the given service sector area.

Further, in certain embodiments disclosed herein, one or more configurable extender modules can also be provided in the DAS to provide expanded routing of communications service sector sets in the DAS. For example, a configurable extender module may be provided in the DAS to divide the one or more communications service sector sets into one or more expanded communications service sector sets to be distributed to the remote communications service sector areas. As another example, the configurable extender module may also be provided in the DAS to receive and combine received communications services from different base stations into common remote communications service sector areas in the DAS. In this manner, the DAS is programmable to allow any combination of communications service sector sets and expanded communications service sector sets from any number of different base stations to be routed to any combination of remote communications service sector areas and expanded remote communications service areas in the DAS.

One embodiment of the disclosure relates to a DAS configured to support expanded, programmable communications services distribution to remote communications service sector areas. The DAS comprises a central unit configured to distribute downlink communications signals to a plurality of remote antenna units over at least one communications medium. Each of the plurality of remote antenna units are configured to receive downlink communications signals from the central unit over the at least one communications medium, each of the plurality of remote antenna units comprise at least one antenna configured to wirelessly distribute the received downlink communications signals. The central unit is configured to receive a downlink communications signal among a plurality of downlink communications signals, for a communications service among one or more communications services from at least one base station. The central unit also comprises at least one first programmable switch. The at least one first programmable switch is configured to receive the plurality of downlink communications signals. The at least one first programmable switch is also configured to switch the plurality of downlink communications signals into one or more downlink communications service sector sets, based on a first programmable configuration for the at least one first programmable switch. The central unit also comprises an extender module. The extender module is configured to receive the one or more downlink communications service sector sets. The extender module is also configured to extend the received one or more downlink communications service sector sets into one or more extended downlink communications service sector sets based on a configuration of the extender module. The central unit is also comprised of at least one second programmable switch. The at least one second programmable switch is configured to receive the one or more extended downlink communications service sector sets. The at least one second programmable switch is also configured to switch the received one or more extended downlink communications service sector sets into one or more remote communications service areas each comprised of a subset of the plurality of remote antenna units, based on a second programmable configuration for the at least one second programmable switch.

Another embodiment of the disclosure relates to a method for distributing expanded, programmable communications services to remote communications service sector areas in a distributed antenna system (DAS). The method comprises receiving a plurality of downlink communications signals for one or more communications services from at least one base station. The method also comprises switching the plurality of downlink communications signals into one or more downlink communications service sector sets in at least one first programmable switch, based on a first programmable configuration for the at least one first programmable switch. The method also comprises extending the received one or more downlink communications service sector sets into one or more extended downlink communications service sector sets based on a configuration for an extender module. The method also comprises switching the received one or more extended downlink communications service sector sets into one or more remote communications service areas in at least one second programmable switch, based on a second programmable configuration for the at least one second programmable switch, each of the one or more remote communications service areas comprised of a subset of a plurality of remote antenna units in the DAS. The method also comprises distributing each of the one or more extended downlink communications service sector sets into their switched remote communications service area among the one or more remote communications service areas.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain the principles and operation of the various embodiments.

BRIEF DESCRIPTION OF THE DRAWINGS

FIG. 7 is a block diagram of a building divided into three (3) areas where each area is served by certain communications service sector sets in designated remote communications service sector areas in the DAS in FIG. 5;

DETAILED DESCRIPTION

Various embodiments will be further clarified by the following examples.

Examples of distributed antenna systems (DASs) supporting expanded, programmable communications services distribution to remote communications service sector areas are discussed below starting at FIG. 5. Before discussing these examples of DASs supporting expanded, programmable communications services distribution to remote communications service sector areas, an exemplary DAS 40 configured to provide RF communications services and/or digital data services to remote antenna units is first described with regard to FIGS. 3 and 4. Digital data services may be those that are digitized within the DAS 40. As will be discussed below, the DAS 40 in FIGS. 3 and 4 does not support communications services distribution to remote communications service sector areas.

Figure 1:
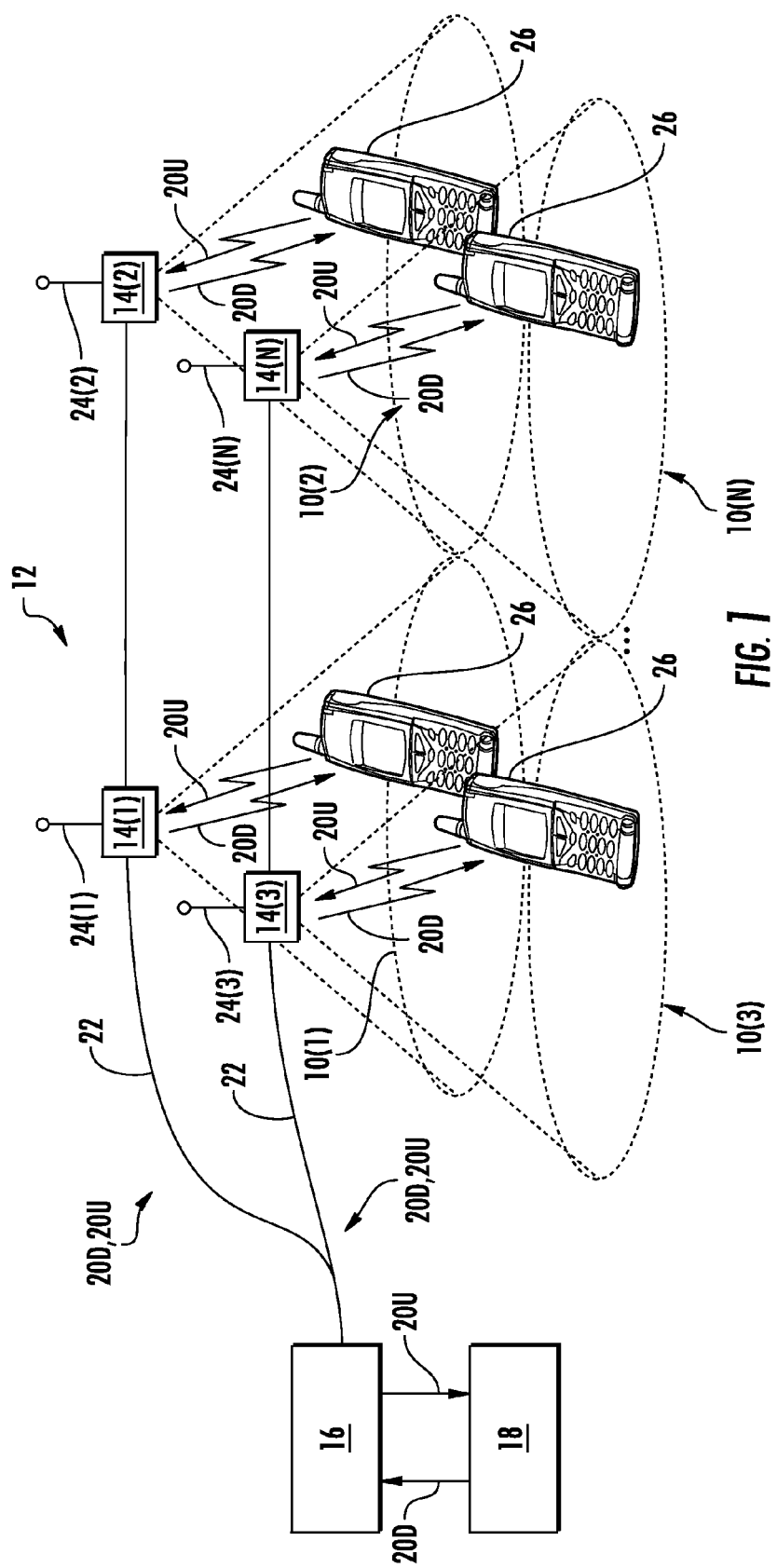
FIG. 1 is a schematic diagram of an exemplary distributed antenna system (DAS) capable of distributing radio frequency (RF) communications services to client devices.
Figure 2:
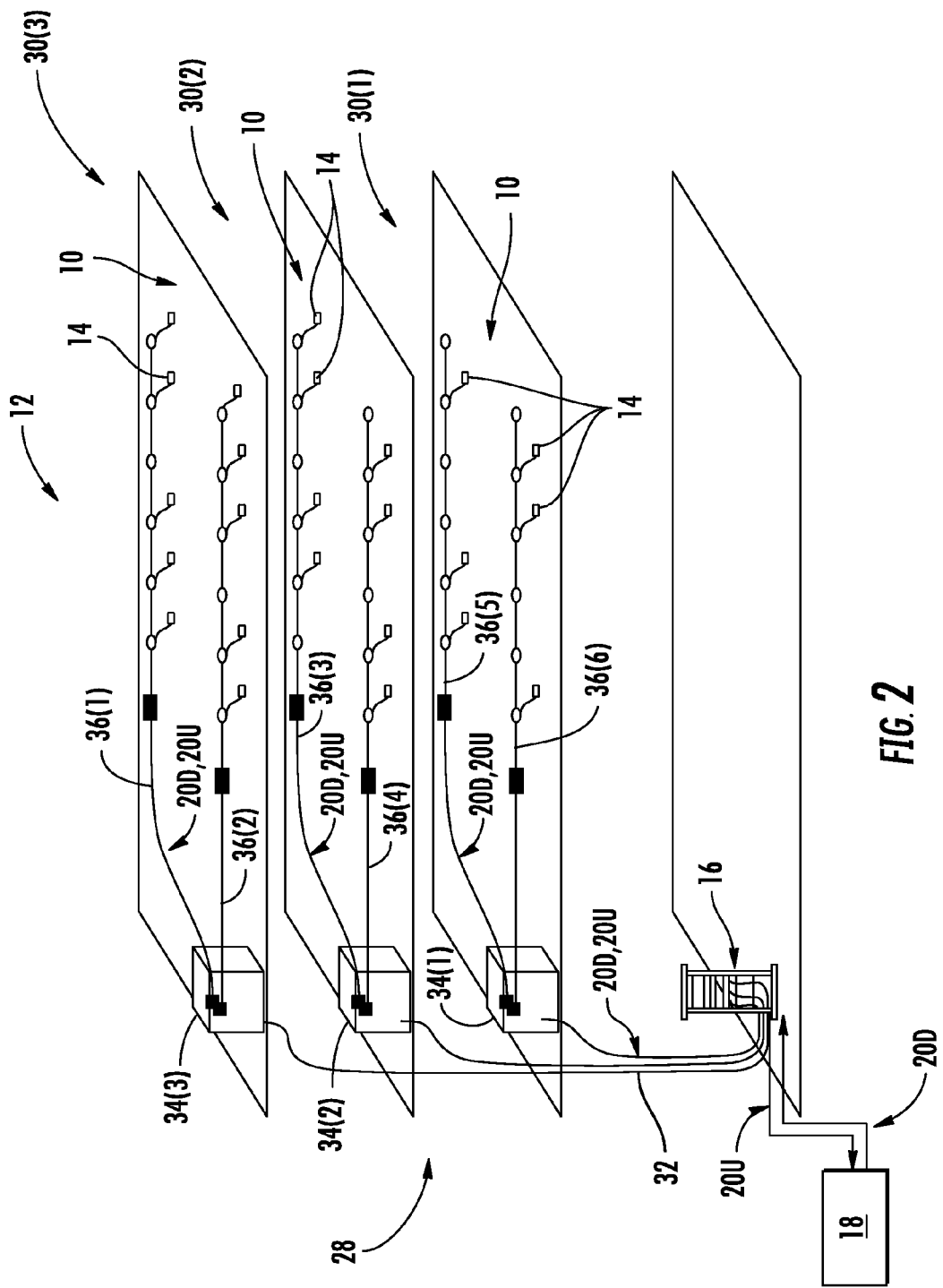
FIG. 2 is a partially schematic cut-away diagram of an exemplary building infrastructure in which the DAS in FIG. 1 can be employed.
Figure 3:
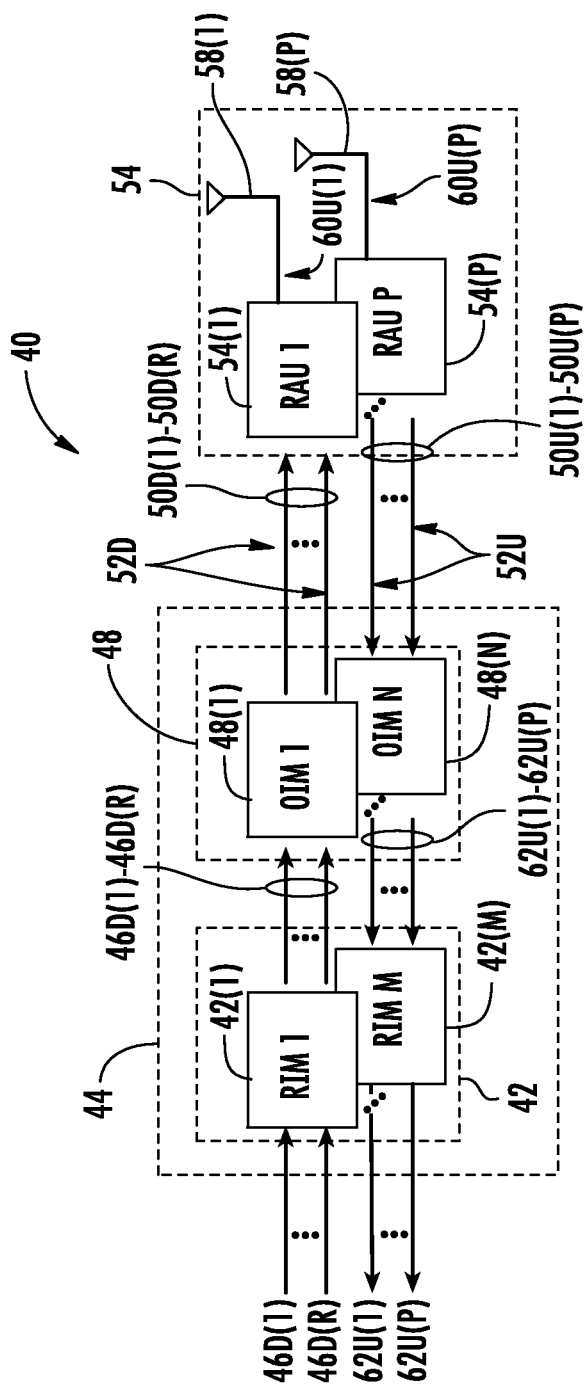
FIG. 3 is a schematic diagram of an exemplary optical fiber-based DAS configured to provide RF communications services and/or digital data services over optical fiber to remote antenna units.

FIG. 3 is a schematic diagram of another exemplary optical fiber-based DAS 40 that may be employed according to the embodiments disclosed herein to provide communications services. In this embodiment, the optical fiber-based DAS 40 includes optical fiber for distributing communications services. The optical fiber-based DAS 40 in this embodiment is comprised of three (3) main components. One or more radio interfaces provided in the form of radio interface modules (RIMs) 42(1)-42(M) in this embodiment are provided in a central unit 44 to receive and process downlink electrical communications signals 46D(1)-46D(R) prior to optical conversion into downlink optical communications signals. The RIMs 42(1)-42(M) provide both downlink and uplink interfaces. The notations "1-R" and "1-M" indicate that any number of the referenced component, 1-R and 1-M, respectively, may be provided. The central unit 44 is configured to accept the plurality of RIMs 42(1)-42(M) as modular components that can easily be installed and removed or replaced in the central unit 44. In one embodiment, the central unit 44 is configured to support up to twelve (12) RIMs 42(1)-42(12).

Each RIM 42(1)-42(M) can be designed to support a particular type of radio source or range of radio sources (i.e., frequencies) to provide flexibility in configuring the central unit 44 and the optical fiber-based DAS 40 to support the desired radio sources. For example, one RIM 42 may be configured to support the Personal Communication Services (PCS) radio band. Another RIM 42 may be configured to support the 700 MHz radio band. In this example, by inclusion of these RIMs 42, the central unit 44 could be configured to support and distribute communications signals on both PCS and LTE 700 radio bands, as an example. RIMs 42 may be provided in the central unit 44 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 42 may also be provided in the central unit 44 that support any wireless technologies desired, including but not limited to Code Division Multiple Access (CDMA), CDMA200, 1xRTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 42 may be provided in the central unit 44 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical communications signals 46D(1)-46D(R) are provided to a plurality of optical interfaces provided in the form of optical interface modules (OIMs) 48(1)-48(N) in this embodiment to convert the downlink electrical communications signals 46D(1)-46D(R) into downlink optical communications signals 50D(1)-50D(R). The notation "1-N" indicates that any number of the referenced component 1-N may be provided. The OIMs 48 may be configured to provide one or more optical interface components (OICs) that contain optical to electrical (O/E) and electrical to optical (E/O) converters, as will be described in more detail below. The OIMs 48 support the radio bands that can be provided by the RIMs 42, including the examples previously described above. Thus, in this embodiment, the OIMs 48 may support a radio band range from 400 MHz to 2700 MHz, as an example.

The OIMs 48(1)-48(N) each include E/O converters to convert the downlink electrical communications signals 46D(1)-46D(R) into the downlink optical communications signals 50D(1)-50D(R). The downlink optical communications signals 50D(1)-50D(R) are communicated over downlink optical fiber(s) 52D to a plurality of remote antenna units 54(1)-54(P). The notation "1-P" indicates that any number of the referenced component 1-P may be provided. O/E converters provided in the remote antenna units 54(1)-54(P) convert the downlink optical communications signals 50D(1)-50D(R) back into the downlink electrical communications signals 46D(1)-46D(R), which are provided to antennas 58(1)-58(P) in the remote antenna units 54(1)-54(P) to client devices in the reception range of the antennas 58(1)-58(P).

E/O converters are also provided in the remote antenna units 54(1)-54(P) to convert uplink electrical communications signals 60U(1)-60U(P) received from client devices through the antennas 58(1)-58(P) into uplink optical communications signals 50U(1)-50U(P) to be communicated over uplink optical fibers 52U to the OIMs 48(1)-48(N). The OIMs 48(1)-48(N) include O/E converters that convert the uplink optical communications signals 50U(1)-50U(P) into uplink electrical communications signals 62U(1)-62U(P) that are processed by the RIMs 42(1)-42(M) and provided as uplink electrical communications signals 62U(1)-62U(P).

Figure 4:
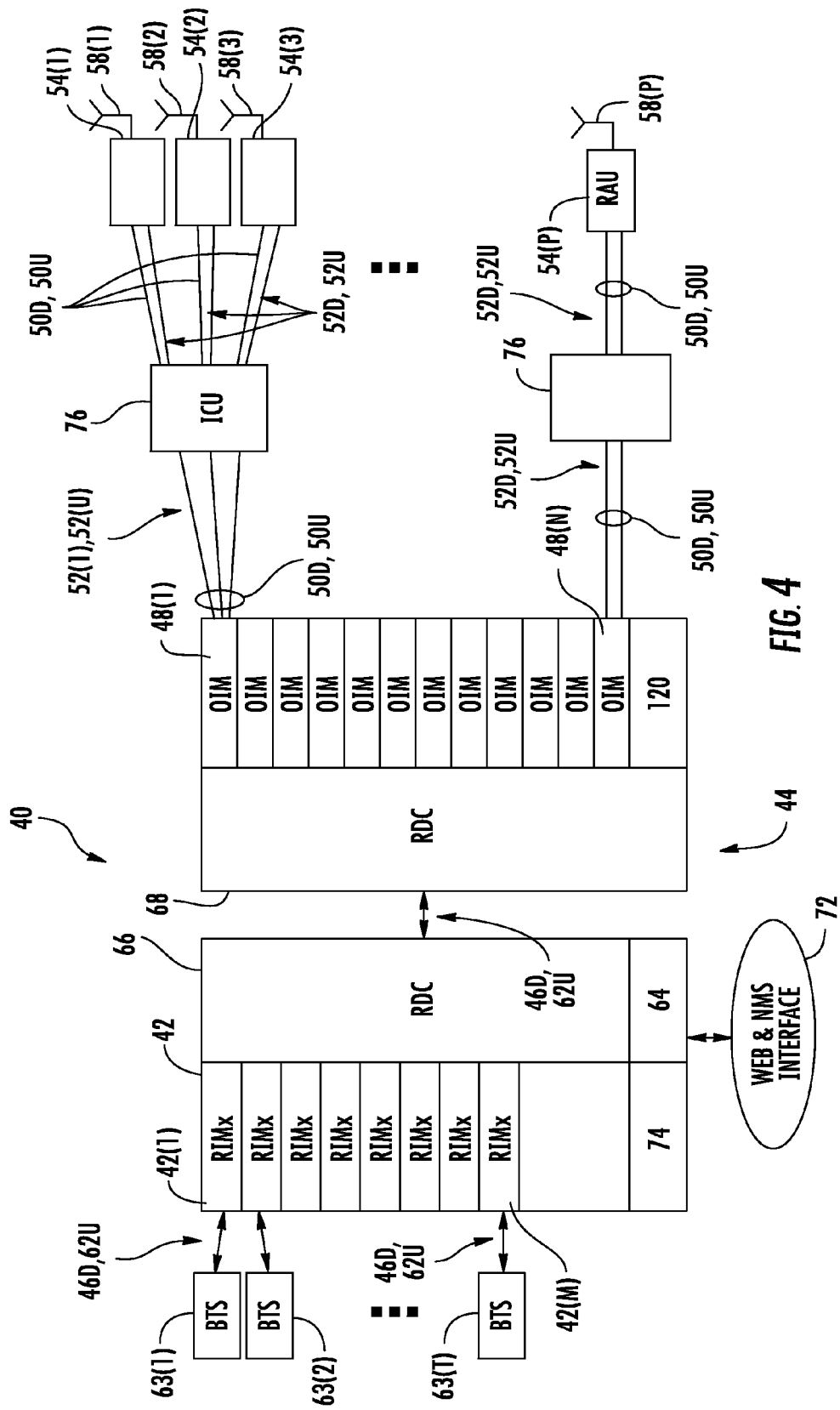
FIG. 4 is a more detailed schematic diagram of the optical-fiber based DAS in FIG. 3.

FIG. 4 is a schematic diagram of providing communications services between base stations 63(1)-63(T) and the remote antenna units 54(1)-54(P) in the optical fiber-based DAS 40 of FIG. 3. Common components between FIGS. 3 and 4 have the same element numbers and thus will not be re-described. As illustrated in FIG. 4, a power supply module (PSM) 64 may be provided to provide power to the RIMs 42(1)-42(M) and radio distribution modules in the form of radio distribution cards (RDCs) 66 that distribute the communications signals from the RIMs 42(1)-42(M) to the OIMs 48(1)-48(N) through radio distribution modules in the form of RDCs 68. A network interface 72, which may include web and network management system (NMS) interfaces, may also be provided to allow configuration and communication to the RIMs 42(1)-42(M) and other components of the optical fiber-based DAS 40. A microcontroller, microprocessor, or other control circuitry, called a head-end controller (HEC) 74 may be included in central unit 44 to provide control operations for the central unit 44 and the remote antenna units 54(1)-54(P). ICUs 76 may be provided for a remote antenna unit 54 or grouping of remote antenna units 54 to provide power in cable(s) carrying the downlink optical fiber(s) 52D and the uplink optical fiber(s) 52U.

The DAS 40 in FIGS. 3 and 4 is configured to provide a given capacity in terms of a supported number of client devices and communications data rate. This capacity is based on the user and data rate capacity of the equipment provided in the DAS 40. As the popularity of wireless client devices continues to increase, the number of wireless client devices that the DAS 40 may need to support may also increase. To support the coverage of additional areas, a greater number of remote antenna units 54 can be provided in the DAS 40 to provide additional remote coverage area and/or provide greater concentrations of remote coverage areas. To satisfy the increased capacity demands, the DAS 40 in FIGS. 3 and 4 may be configured to provide additional capacity to each of the remote antenna units 54(1)-54(P). However, some remote coverage areas of the DAS 40 may be less populated than other remote coverage areas, and thus have different capacity demands. If the DAS 40 is configured to provide increased capacity in each of the remote antenna units 54(1)-54(P), the capacity in some remote coverage areas will be underutilized.

Figure 5:
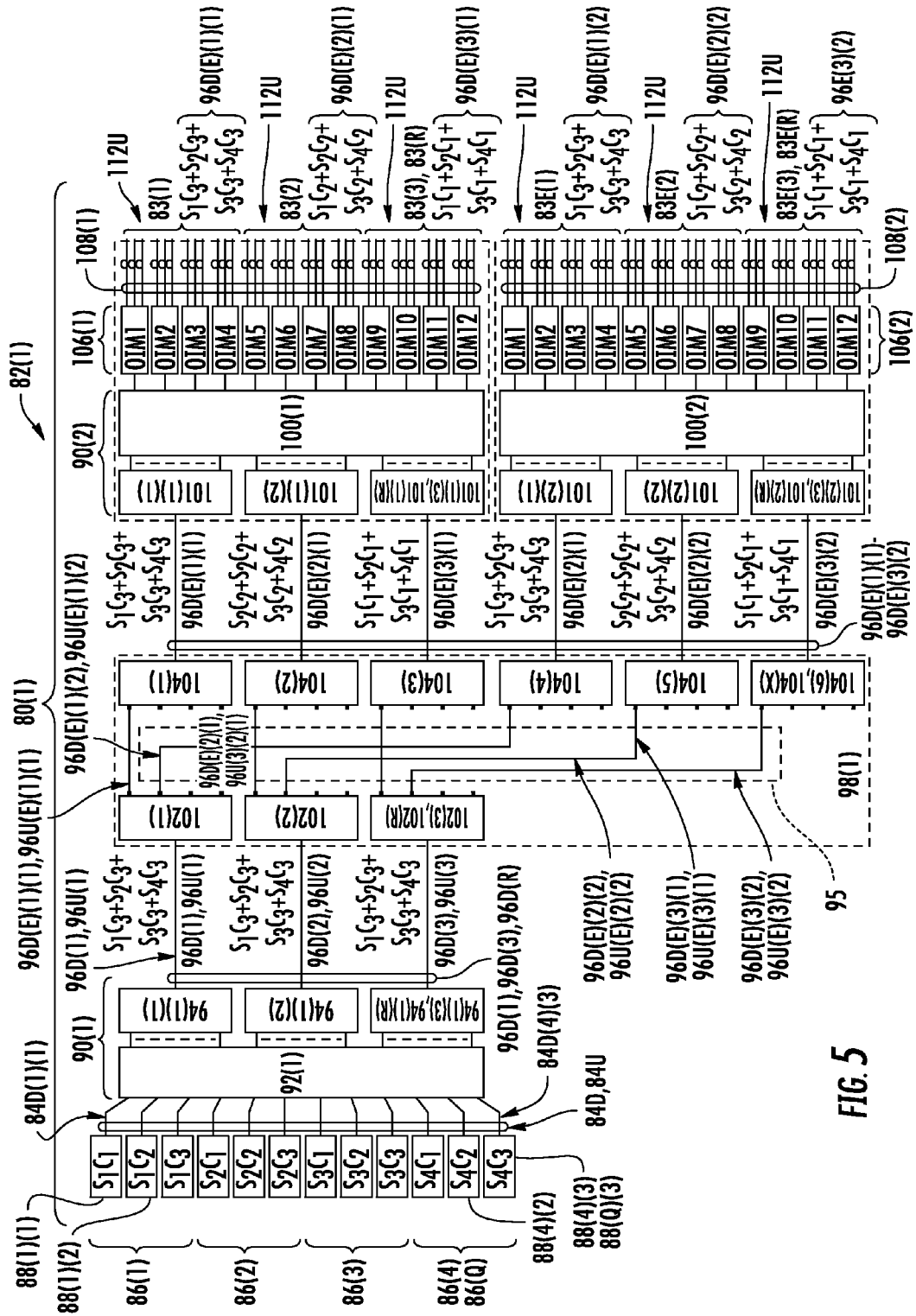
FIG. 5 is a logical diagram of the DAS in FIG. 3 illustrating a first programmable switching matrix in a central unit configured to divide downlink communications signals into one or more communications service sector sets that are extended by an extender module to expanded communications service sector sets provided to additional second programmable switching matrices to distribute the expanded communications service sector sets to expanded remote antenna unit groupings to form expanded remote communications service sector areas in the DAS.

In this regard, as will be discussed in more detail below, FIG. 5 illustrates an exemplary central unit 80(1) of a DAS 82(1) configured to support expanded, programmable communications services distribution to remote communications service areas 83. The remote units of the DAS 82(1) are not shown in FIG. 5 for convenience of the illustration only. In this example, the remote communications service areas comprises remote communications service areas 83(1)-83(3), 83(R) and expanded remote communications service areas 83E(1)-83E(3), 83E(R). In this example, the total number of remote communications service areas 83, is six (6), which is comprised of three (3) remote communications service areas 83(1)-83(3) and three (3) expanded remote communications service areas 83E(1)-83E(3). Remote antenna units 54(1)-54(P) (see FIG. 4) are provided in each remote communications service area 83(1)-83(3), 83(R) and expanded remote communications service area 83E(1)-83E(3), 83E(R) to distributed the expanded, programmable communications services in the remote communications service areas 83(1)-83(3), 83(R) and 83E(1)-83E(3), 83E(R). In this regard, the central unit 80(1) in FIG. 5 is configured to receive downlink communications signals 84D for one or more communications services from one or more base stations 86(1)-86(Q), wherein 'Q' can be any number of base stations. In this example, there are four (4) base stations 86(1)-86(4). Each base station 86(1)-86(4) in this example has three (3) RIMs 88(1)(1)-88(4)(3) for total of twelve (12) RIMs 88 provided among the four (4) base stations 86(1)-86(4) in this non-limiting example. Each RIM 88(1)(1)-88(4)(3) is configured to provide a respective downlink communications signal 84D(1)-84D(4). As an example, the downlink communications signals 84D(1)-84D(4) may be radio-frequency (RF) signals that support one or more RF communications services, digital signals that support one or more digital data communications services, or any combination thereof.

With continuing reference to FIG. 5, in this example, the downlink communications signals 84D are downlink communications signals 84D(1)(1)-84D(4)(3), meaning that the respective base stations 86(1)-86(4) are each configured to provide the downlink communications signals 84D(1)-84D(4) in three (3) different sectors designated as downlink communications signals 84D(1)(1)-84D(4)(3). Each downlink communications signal 84D(1)(1)-84D(4)(3) for a given base station 86(1)-86(4) may provide the same or a different communications service. For example, in this embodiment as an example, the downlink communications signal 84D(1)(1) from base station 86(1) is sectorized. This is shown in FIG. 5 as $S_1C_1$ for a first communication service $S_1$ in a first sector $C_1$. Downlink communications signal 84D(1)(2) is also from base station 86(1) and shown as $S_1C_2$ for the first communication service $S_1$ also in sector $C_1$. Downlink communications signal 84D(4)(3) is also from base station 86(4) and shown as $S_4C_3$ for a fourth communication service $S_4$ in sector $C_3$. Note that it is also possible that the received downlink communications signals 84D(1)(1)-84D(4)(3) may not be sectorized by the base stations 86(1)-86(4). In this example, the downlink communications signals 84D(1)(1)-84D(4)(3) from the respective base stations 86(1)-86(4) are shown as $S_1C_1$, $S_1C_2$, $S_1C_3$, $S_2C_1$, $S_2C_2$, . . . , $S_4C_2$, $S_4C_3$ representing four (4) different communication services, namely the first, second, third, and fourth communications services $S_1$-$S_4$, provided over three (3) different sectors, namely the first, second and third sectors $C_1$-$C_3$. The communication services $S_1$-$S_4$ may be the same or different communication services.

With continuing reference to FIG. 5, the downlink communications signals 84D(1)(1)-84D(4)(3) can be specifically directed to the desired remote communications service areas 83(1)-83(3), 83(R) and expanded remote communications service areas 83E(1)-83E(3), 83E(R) based on the capacity needs and capacity capability of the DAS 82(1). This is opposed to the DAS 40 in FIG. 3 only having the capability of equally distributing the downlink communications signals 84D(1)(1)-84D(4)(3) to all remote antenna units. Thus, the central unit 80(1) in the DAS 82(1) in FIG. 5 takes advantage of the receipt of downlink communications signals 84D(1)(1)-84D(4)(3) provided by the base stations 86(1)-86(4) to distribute the downlink communications signals 84D(1)(1)-84D(4)(3) in desired communications service sector set or sets to the remote communications service areas 83(1)-83(3), 83(R) and expanded remote communications service areas 83E(1)-83E(3), 83E(R) in the DAS 82(1).

For example, as shown in FIG. 5 and discussed in more detail below, a first programmable switch 90(1) is configured to switch the downlink communications signals 84D(1)(1)-84D(4)(3) into one or more downlink communications service sector sets 96D(1)-96D(R). 'R' is equal to three (3) in this example based on a first programmable configuration for the first programmable switch 90(1). The first programmable switch 90(1) is comprised of a first programmable switching matrix 92(1) and a plurality of first radio distribution modules 94(1)(1)-94(1)(3), 94(1)(R). The first programmable switching matrix 92(1) is configured to receive and switch selected downlink communications signals 84D(1)(1)-84D(4)(3) to the first radio distribution modules 94(1)(1)-94(1)(3) based on a first programmable configuration for the first programmable switching matrix 92(1). The programmable configuration for the first programmable switching matrix 92(1) is based on how the downlink communications signals 84D(1)(1)-84D(4)(3) are desired to be sectorized for distribution to the remote antenna units 54(1)-54(P) (see FIG. 4). The first programmable switching matrix 92(1) is configured to distribute the downlink communications service sector sets 96D(1)-96D(3), 96D(R) to different first radio distribution modules 94(1)(1)-94(1)(3). In this example, three (3) first radio distribution modules 94(1)(1)-94(1)(3) support up to three unique combinations of downlink communications service sector sets 96D. Thus, the number of first radio distribution modules 94(1)(1)-94(1)(3) determines the number of unique sectors that can be provided in the DAS 82. The downlink communications service sector sets 96D(1)-96D(3), 96D(R) may also be defined as a communications sub-service since it may include a subset of the communications services distributed by the DAS 82(1). The first radio distribution modules 94(1)(1)-94(1)(3)

are each configured to receive a downlink communications service sector set 96D according to the switching and combining provided the first programmable switching matrix 92(1) be distributed to an extender module 98(1) to allow the downlink communications service sector sets 96D(1)-96D(3), 96D(R) to be distributed to remote communications service area 83 and expanded remote communications service area 83E. Thus, as described above, each of the remote communications service areas 83, 83E can transmit a unique combination of service sectors of $S_1C_1$-$S_4C_3$. In this example, the unique combination of service sectors possible is defined by R!, where R is the number of RDCs 94.

Note that the first programmable switch 90(1) could be provided as part of a module that supports the RIMs 88 and not a separate module. Also note that the extender module 98(1) is not limited to a single module. The functionality of the extender module 98(1) could be provided in multiple sub-extender modules, where each sub-extender module is configured to distribute certain of the downlink communications service sector sets 96D(1)-96D(3), 96D(R) to remote communications service area 83 and expanded remote communications service area 83E. The extender module 98(1) in FIG. 5 will be described in more detail below.

Figure 6:
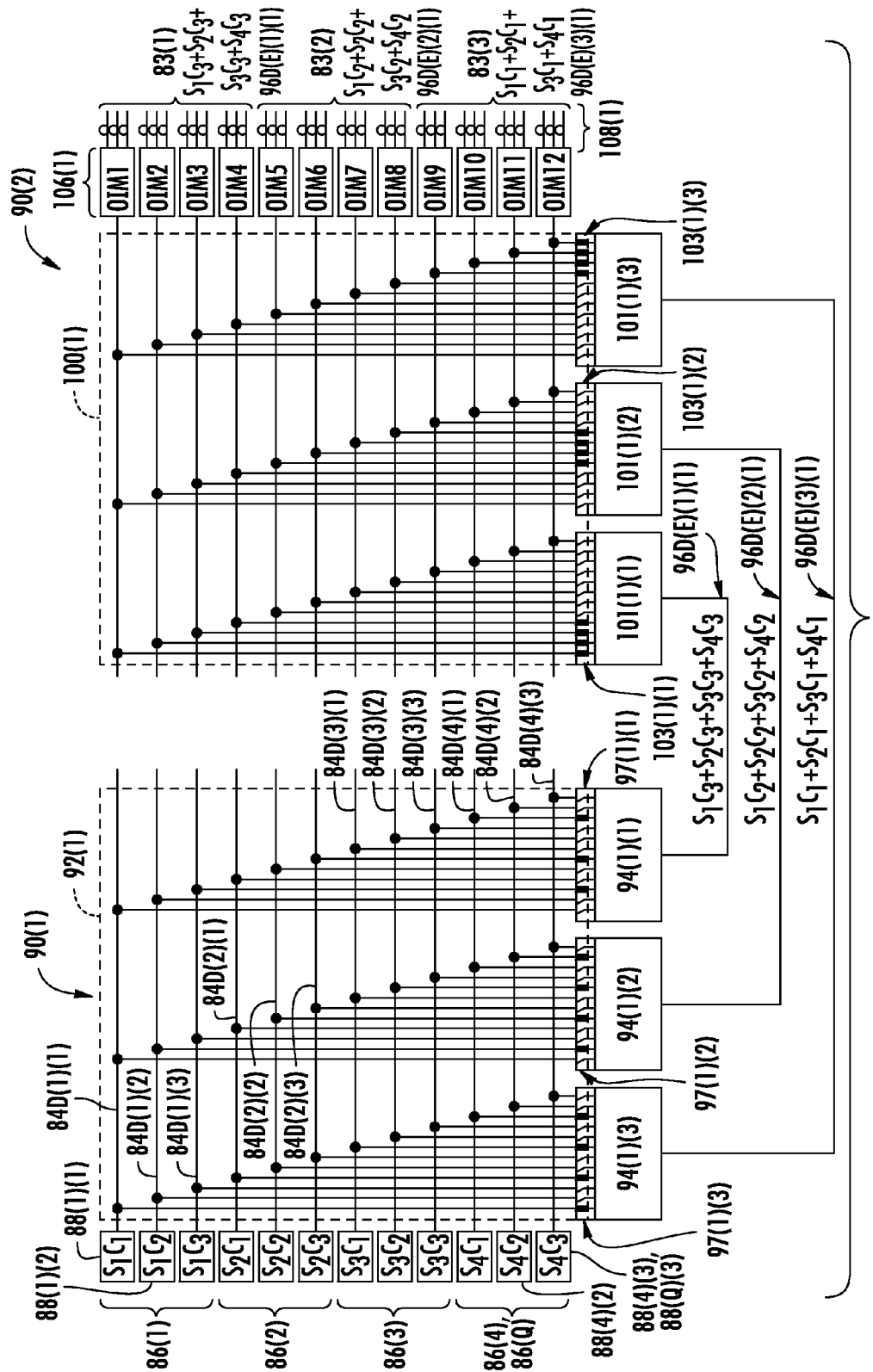
FIG. 6 is a schematic diagram illustrating more detail of the first programmable switching matrix in the DAS in FIG. 5 configured to divide the received communications services into different communications service sector sets, and a second programmable switching matrix configured to distribute the expanded communications service sector sets to the expanded remote communications service sector areas.

FIG. 6 illustrates more detail of the first programmable switching matrix 92(1) in the DAS 82(1) in FIG. 5 to further explain its operation by example. As illustrated in FIG. 6, the first programmable switching matrix 92(1) can be programmed to combine the downlink communications signals 84D(1)(1)-84D(4)(3) into three distinct downlink communications service sector sets 96D(1)-96D(3), 96D(R). Each of the downlink communications signals 84D(1)(1)-84D(4)(3) are coupled to a respective first switch bank 97(1)(1)-97(1)(3) comprised of a plurality of switches for each first radio distribution module 94(1)(1)-94(1)(3), 94(1)(R), respectively, wherein 'R' can represent any number of radio distribution module desired. The switch banks 97(1)(1)-97(1)(3) of first programmable switching matrix 92(1) could reside physically in respective RIMs 88(1)-88(Q), as a non-limiting example. The first switch bank 97(1)(1)-97(1)(3) can be programmable to cause a switch therein to select which downlink communications signals 84D(1)(1)-84D(4)(3) will be selected to be distributed to their respective first radio distribution module 94(1)(1)-94(1)(3). In this manner, the first programmable switching matrix 92(1) and its first switch banks 97(1)(1)-97(1)(3) can be switched to select which set or subset of the downlink communications signals 84D(1)(1)-84D(4)(3) will be provided in the service sector set that each first radio distribution module 94(1)(1)-94(1)(3) will provide and distribute in the DAS 82(1) shown in FIG. 5.

In this example of the first programmable switch 92(1) in FIGS. 5 and 6, the first switch bank 97(1)(1) is programmed to select the downlink communications signals 84D(1)(3), 84D(2)(3), 84D(3)(3), and 84D(4)(3), which are all sector 3 downlink communications signals from the base stations 86(1)-86(4) to be distributed to the first radio distribution module 94(1)(1). The first switch bank 97(1)(2) is programmed to select the downlink communications signals 84D(1)(2), 84D(2)(2), 84D(3)(2), and 84D(4)(2), which are all sector 2 downlink communications signals from the base stations 86(1)-86(4) to be distributed to the first radio distribution module 94(1)(2). The first switch bank 97(1)(3) is programmed to select the downlink communications signals 84D(1)(1), 84D(2)(1), 84D(3)(1), and 84D(4)(1), which are all sector 1 downlink communications signals from the base stations 86(1)-86(4) to be distributed to the first radio distribution module 94(1)(3). Note that any other selection configurations for the downlink communications signals 84D(1)(1)-84D(4)(3), balanced or unbalanced, could be provided. A balanced selection means that the same number of downlink communications signals 84D are switched by each of the first switch banks 97(1)(1)-97(1)(3) in the first programmable switching matrix 92(1).

With reference back to FIG. 5, the extender module 98(1) is configured to receive the downlink communications service sector sets 96D(1)-96D(3) from the first radio distribution modules 94(1)(1)-94(1)(3). The extender module 98(1) is also configured to extend the downlink communications service sector sets 96D(1)-96D(3) into one or more extended downlink communications service sector sets 96D(E)(1)(1)-96D(E)(R) based on a configuration of the extender module 98(1). The extender module 98(1) is configured to extend or expand the three (3) downlink communications service sector sets 96D(1)-96D(3) into a larger number of extended downlink communications service sector sets 96D(E)(1)(1)-96D(E)(3)(2), 96D(E)(R) to be able to extend the downlink communications service sector sets 96D(1)-96D(3) to a greater number of remote communications service sector sets.

In this regard, in this example with reference to FIG. 5, there are six (6) total extended downlink communications service sector sets 96D(E)(1)(1), 96D(E)(1)(2), 96D(E)(2)(1), 96D(E)(2)(2), 96D(E)(3)(1), 96D(E)(3)(2), that can each be provided to a respective remote communications service area 83(1)-83(3), 83E(1)-83E(3). However, note that if a DAS that allows for the downlink communications service sector sets 96D(1)-96D(3), 96D(R) to be distributed to more than six (6) remote communications service areas 83(1)-83(3) and 83E(1)-83E(3) is desired, the extender module 98(1) is provided with this capability.

In this regard, with continuing reference to FIG. 5, the extender module 98(1) contains three (3) extender splitters 102(1)-102(3). As will be discussed in more detail below, the extender splitters 102(1)-102(3) may also include combiners for combining uplink communications signals. The three (3) extender splitters 102(1)-102(3) are configured to extend the respective received downlink communications service sector sets 96D(1)-96D(3). The three (3) extender splitters 102(1)-102(3) are further configured to split the received one or more downlink communications service sector sets 96D(1)-96D(3) into a plurality of the extended downlink communications service sector sets 96D(E)(1)(1)-96D(E)(3)(2) based on the configuration of the extender module 98(1). In this example, each extender splitter 102(1)-102(3) is configured to split the respective received downlink communications service sector sets 96D(1)-96D(3) into two extended downlink communications service sector sets 96D(E)(1)(1), 96D(E)(1)(2); 96D(E)(2)(1), 96D(E)(2)(2); and 96D(E)(3)(1), 96D(E)(3)(2), respectively, for a total of six extended downlink communications service sector sets 96D(E)(1)(1)-96D(E)(3)(2). Each extended downlink communications service sector sets 96D(E)(1)(1)-96D(E)(3)(2) is provided to a respective extender distribution module 104(1)-104(6) based on the configuration of the extender module 98(1). In this example, there are six (6) extender distribution modules 104(1)-104(6) to be able to provide the extended downlink communications service sector sets 96D(E)(1)(1)-96D(E)(3)(2) to up to six (6) different remote communications service areas 83(1)-83(3) and 83E(1)-83E(3), based on a configuration of the extender module 98(1).

With continuing reference to FIG. 5, to distribute the extended downlink communications service sector sets 96D(E)(1)(1)-96D(E)(3)(2) to the desired remote communications service area 83(1)-83(3) or expanded remote communications service area 83E(1)-83E(3) in the DAS 82(1), a second programmable switch 90(2) is provided in the DAS 82(1). The second programmable switch 90(2) is configured to receive the extended downlink communications service sector sets 96D(E)(1)(1)-96D(E)(3)(2) from the extender module 98(1). The second programmable switch 90(2) is further configured to switch the received extended downlink communications service sector sets 96D(E)(1)(1)-96D(E)(3)(2), or a combination thereof, to one or more remote communications service areas 83(1)-83(3), 83(R) or expanded remote communications service areas 83E(1)-83E(3), 83E(R), each having one or more remote antenna units 54(1)-54(P) (see FIG. 4). Each remote antenna unit 54(1)-54(P) distributes the received respective extended downlink communications service sector set 96D(E)(1)(1)-96D(E)(3)(2) in the DAS 82(1). In this example, extended downlink communications service sector set 96D(E)(1)(1) is provided to remote communications service area 83(1). Extended downlink communications service sector set 96D(E)(2)(1) is provided to remote communications service area 83(2). Extended downlink communications service sector set 96D(E)(3)(1) is provided to remote communications service area 83(3), and so on as shown in FIG. 5. However, note that this example is not limiting. As will be discussed in more detail below, the second programmable switch 90(2) can be programmed to distribute the extended downlink communications service sector set 96D(E)(1)(1)-96D(E)(3)(2) to any of the remote communications service areas 83(1)-83(3), 83(R) or expanded remote communications service areas 83E(1)-83E(3), 83E(R), as desired.

More particularly, with continuing reference to FIG. 5, the second programmable switch 90(2) in this example, is comprised of a plurality of second radio distribution modules 101(1)(1)-101(1)(3), 101(1)(R) and 101(2)(1)-101(2)(3), 101(2)(R). In this example, the total number of second radio distribution modules 101 is six (6), the same number as the number of extender distribution modules 104(1)-104(6). This is so that the second programmable switch 90(2) is capable of receiving and switching each of the extended downlink communications service sector sets 96D(E)(1)(1)-96D(E)(3)(2) independently from each other to the desired remote communications service areas 83(1)-83(3) and 83E(1)-83E(3) in this example. The second radio distribution modules 101(1)(1)-101(2)(3), are each configured to receive a respective extended downlink communications service sector set 96D(E)(1)(1)-96D(E)(3)(2) from the extender module 98(1). The second radio distribution modules 101(1)(1)-101(1)(3) and 101(2)(1)-101(2)(3) are also each configured to distribute the received extended downlink communications service sector set 96D(E)(1)(1)-96D(E)(3)(2) to a respective second programmable switching matrix 100(1), 100(2) to be distributed to the desired remote communications service area 83(1)-83(3) and 83E(1)-83E(3), as discussed below.

With continuing reference to FIG. 5, the number of second programmable switching matrices 100(1), 100(2) is two (2) in this example. This is because each second programmable switching matrix 100(1), 100(2) is configured to support up to three (3) remote communication service areas 83 or three (3) expanded remote communications service areas 83E, respectively. Thus, in this example, the second programmable switching matrix 100(1) supports remote communication service areas 83(1)-83(3), and the second programmable switching matrix 100(2) supports expanded remote communication service areas 83E(1)-83E(3). Each second programmable switching matrix 100(1), 100(2) is configured to receive three (3) extended downlink communications service sector sets 96D(E)(1)(1)-96D(E)(3)(2) from a respective radio distribution module 101(1)(1)-101(1)(3) and 101(2)(1)-101(2)(3) and switch the received extended downlink communications service sector sets 96D(E)(1)(1)-96D(E)(3)(2) to the desired remote communications service area 83(1)-83(3), 83E(1)-83E(3) based on the second programmable configuration for the second programmable switching matrices 100(1), 100(2).

With continuing reference to FIG. 5, in this example, the second programmable switching matrices 100(1), 100(2) are coupled to respective optional, optical interface modules (OIMs) 106(1), 106(2). The OIMs 106(1), 106(2) may be provided in an optical interface unit (OIU) as part of the central unit 80(1) in one example. Further, the splitters 102(1)-102(R) of the extender module 98(1) can be split within the central unit 80(1) to be disposed in a head-end unit (HEU), and the extender distribution modules 104(1)-104(X) can be disposed in an optical interface unit (OIU). The OIMs 106(1), 106(2) are configured to convert the extended downlink communications service sector sets 96D(E)(1)(1)-96D(E)(3)(2) into respective optical extended downlink communications service sector sets 96D(E)(1)(1)-96D(E)(3)(2), which are then distributed over respective optical fiber 108(1), 108(2) (e.g., within fiber optic cable) to the remote communications service areas 83(1)-83(3) and expanded remote communications service areas 83E(1)-83E(3). In this regard, the DAS 82(1) in this example in FIG. 5 is an optical fiber-based DAS. Each OIM 106(1), 106(2) supports a remote antenna unit 54(1)-54(P) in a remote communications service area 83 and expanded remote communications service area 83E, respectively. The remote antenna units 54(1)-54(P) (see FIG. 4) in the remote communications service areas 83(1)-83(3) and 83E(1)-83E(3) are capable of converting the received optical extended downlink communications service sector sets 96D(E)(1)(1)-96D(E)(3)(2) back into electrical signals. In this example, each second programmable switching matrix 100(1), 100(2) is configured to interface with twelve (12) OIMs 106, wherein four (4) OIMs are dedicated to a remote communications service area 83(1)-83(3) or expanded remote communications service area 83E(1)-83E(3). Thus, each of the remote communications service areas 83(1)-83(3) and expanded remote communications service areas 83E(1)-83E(3) in this example support up to four (4) remote antenna units 54(1)-54(P) (see FIG. 4). Note that the second programmable switch 100(1) could be provided as part of the OIMs 106 and not a separate module, as one example.

Thus, by providing the extender module 98(1) in the example of FIG. 5, linear expansion of a DAS 82(1) is possible by being able to connect any number of sets of OIMs 106(1)-106(X) to any number of RIMs 88(1)-88(Q) to provide any number of communication service sector sets. The extender module 98(1) allows the number of communications service sector sets 96D, 96U to be expanded and increased as desired for flexibility. Note that the extender module 98(1) in FIG. 5 is shown as a logical diagram. The extender module 98(1) could comprise more than one extender module where the ports of the extender splitters 102(1)-102(3) and the extender distribution module 104(1)-104(6) distributed among multiple extender modules.

Also note that an optional programmable switching matrix 95 could be provided in the extender module 98(1) in FIG. 5 to allow any extender splitter 102(1)-102(3) to extend the respective received downlink communications service sector sets 96D(1)-96D(3) to any extender distribution module 104(1)-104(6). In this manner, specific fixed cabling connections would not be required between the extender splitters 102(1)-102(3) and the extender distribution modules 104(1)-104(6). If it is desired to extend respective received downlink communications service sector sets 96D (1)-96D(3) to different OIMs 106, the programmable switching matrix 95 could be programmed or reprogrammed to change the routing of the received downlink communications service sector sets 96D(1)-96D(3) from the extender splitters 102(1)-102(3) to extender distribution modules 104(1)-104(6) in the extender module 98(1). The programmable switching matrix 95 could be provided as part of the extender splitters 102(1)-102(3), the extender distribution modules 104(1)-104(6), or as a standalone module.

FIG. 6 also illustrates more detail of the second programmable switching matrix 100(1) in the DAS 82(1) in FIG. 5 that supports the remote communications service areas 83(1)-83(3) to further explain its operation by example. The second programmable switching matrix 100(2) that supports the expanded remote communications service areas 83E(1)-83E(3) is not shown in FIG. 6, but its operation is similar to the operation of the second programmable switching matrix 100(1).

As illustrated in FIG. 6, the second programmable switching matrix 100(1) can be programmed to switch the extended downlink communications service sector sets 96D (E)(1)-96D(E)(3) received from the extender module 98(1) to a respective OIM 106(1). The selected OIM 106(1) controls which remote communications service area 83 and remote antenna unit 54 (see FIG. 4) within the remote communications service area 83 that the given extended downlink communications service sector sets 96D(E)(1)(1)- 96D(E)(3)(1) is distributed. Each of the extended downlink communications service sector sets 96D(E)(1)(1)-96D(E)(3) (1) are coupled to a respective second radio distribution module 101(1)(1)-101(1)(3). Each second radio distribution module 101(1)(1)-101(1)(3) has a respective second switch 103(1)(1)-103(1)(3). The second switches 103(1)(1)-103(1) (3) of the second programmable switching matrices 100(1), 100(2) could reside physically in respective OIMs 106(1), 106(2), as a non-limiting example. The second switches 103(1)(1)-103(1)(3) can be programmable to select which extended downlink communications service sector sets 96D (E)(1)(1)-96D(E)(3)(1) will be selected to be distributed to their respective OIMs 106(1). In this manner, the second programmable switching matrix 100(1) and its second switches 103(1)(1)-103(1)(3) can be switched to select which set or subset of the extended downlink communications service sector sets 96D(E)(1)(1)-96D(E)(3)(1) will be provided in the sector that each second radio distribution module 101(1)(1)-101(1)(3) supports in the DAS 82(1).

In this example of the second programmable switch 100(1) in FIGS. 5 and 6, the second switch 103(1)(1) is programmed to select the extended downlink communications service sector set 96D(E)(1)(1) to be distributed to the remote communications service area 83(1). The second switch 103(1)(2) is programmed to select extended downlink communications service sector set 96D(E)(2)(1) to be distributed to the remote communications service area 83(2). The second switch 103(1)(3) is programmed to select extended downlink communications service sector set 96D (E)(3)(1) to be distributed to the remote communications service area 83(3). Further, the ability of the second switches 103(1)(1)-103(1)(3) to switch any of the extended downlink communications service sector sets 96D(E)(1)(1)-96D(E)(3) (1) on a per OIM 106(1) basis allows any combination of the extended downlink communications service sector sets 96D (E)(1)(1)-96D(E)(3)(1) to be provided to any remote antenna unit 54(1)-54(P) (see FIG. 4).

Figure 8:
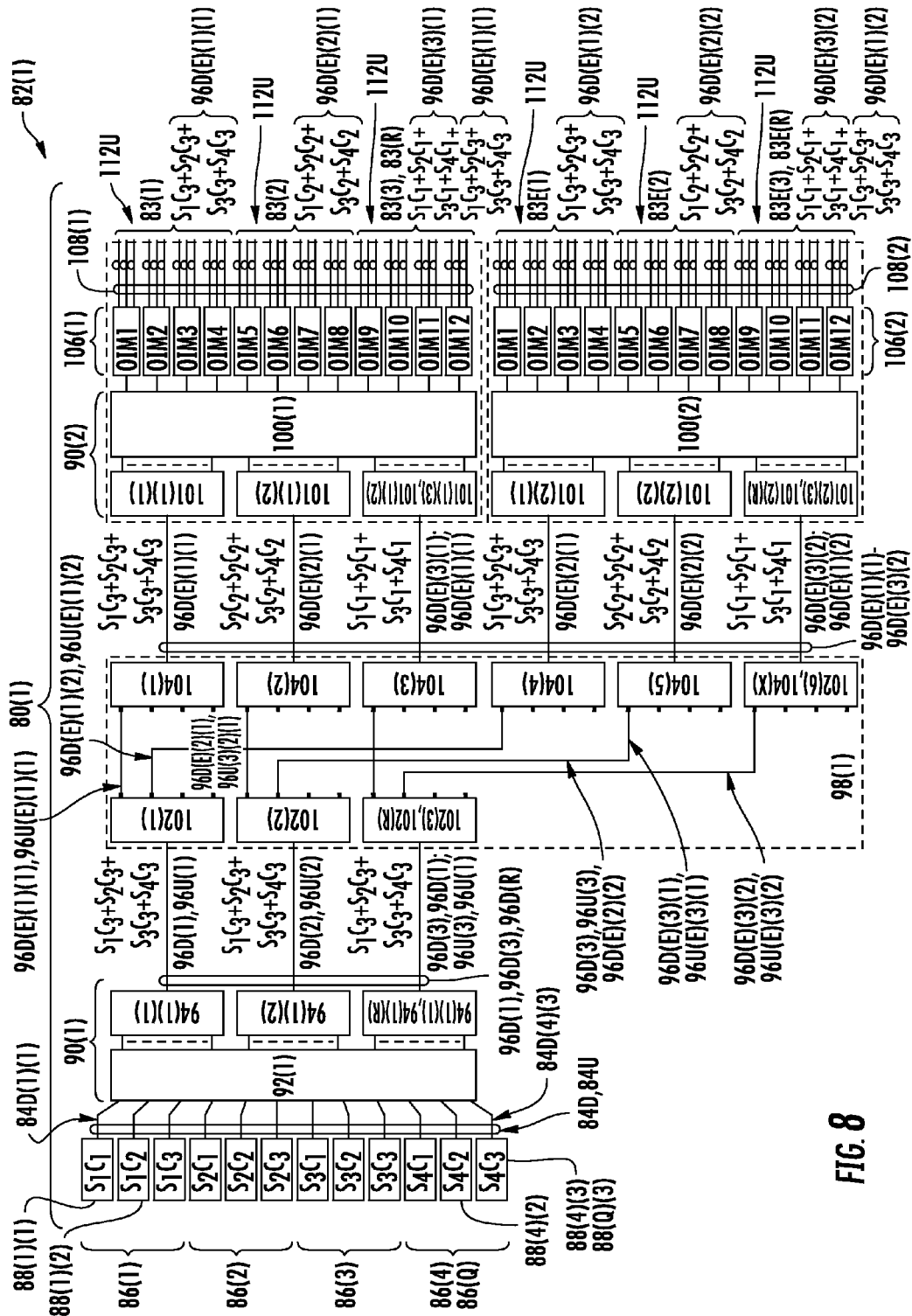
FIG. 8 is a logical diagram of the DAS in FIG. 5 configured to provide the communications service sector sets in the designated remote communications service sector areas in the DAS according to the remote communications service sector configuration in FIG. 7.

Note that the second programmable switching matrix 100(1) also allows any other configurations for selecting which extended downlink communications service sector sets 96D(E)(1)(1)-96D(E)(3)(1) are supported in which remote communication service areas 83 or extended remote communications service areas 83E. For example, an extended downlink communications service sector set 96D (E) could be distributed to both the remote communications service area 83 and the extended remote communications service areas 83E, or a plurality of any combination thereof. For example, FIG. 7 is an exemplary building 110 illustrating exemplary remote communication service areas 83(1)- 83(3) providing certain communications service sector sets 96 therein for the DAS 82(1) in FIG. 5. The first and second programmable switching matrices 90(1), 100(1) are configured so that the remote communication service area 83(1) supports extended downlink communications service sector set 96D(E)(3)(1), which corresponds to downlink communications service sector set 96D(3). Remote communication service area 83(2) supports extended downlink communications service sector set 96D(E)(2)(1), which corresponds to downlink communications service sector set 96D(2). However, remote communication service area 83(3) supports two extended downlink communications service sector sets, 96D (E)(1)(1) and 96D(E)(3)(1), which corresponds to downlink communications service sector sets 96D(1) and 96D(3), respectively. FIG. 8 also shows the DAS 82(1) in FIG. 5, but configured with a communications service sector configuration as provided in FIG. 7. Additionally, the extended remote communications service area 83E(3) is also shown as supporting two extended downlink communications service sector sets, 96D(E)(1)(2) and 96D(E)(3)(2), which also corresponds to downlink communications service sector sets 96D(1) and 96D(3), respectively. Thus, the remote communications service area 83(3) and extended remote communications service area 83E(3) in the DAS 82(1) in FIG. 8 supports the same downlink communications service sector sets, downlink communications service sector sets 96D(1) and 96D(3), and support the same sectorization in this example.

The DAS 82(1) in FIG. 5 also supports distributing uplink communications signals from the remote antenna units 54(1)-54(P) (see FIG. 4) to the central unit 80(1) to be provided to the base stations 86(1)-84(4). In this regard, the second programmable switching matrices 100(1), 100(2) can also be provided that are capable of receiving uplink communications signals 112U from remote antenna units 54(1)-54(P) (see FIG. 4). The second programmable switching matrices 100(1), 100(2) can be configured to switch the uplink communications signals 112U into extended uplink communications service sector sets 96U(E)(1)(1)-96U(E)(3) (2) to be distributed to respective second radio distribution modules 101(1)(1)-101(1)(3) and 101(2)(1)-101(2)(3), based on the programmed configuration for the second programmable switching matrices 100(1), 100(2). In one example, the second programmable switching matrices 100 (1), 100(2) are programmed to switch the received uplink communications signals 112U into extended uplink communications service sector sets 96U(E)(1)(1)-96U(E)(3)(2) to be distributed to the same second radio distribution modules 101(1)(1)-101(1)(3) and 101(2)(1)-101(2)(3) as the second programmable switching matrices 100(1), 100(2) are programmed to receive the extended downlink communications service sector sets 96D(E)(1)(1)-96D(E)(3)(2) from the second radio distribution modules 101(1)(1)-101(1)(3) and 101

(2)(1)-101(2)(3). The second radio distribution modules 101(1)(1)-101(1)(3) and 101(2)(1)-101(2)(3) are configured to distribute the extended uplink communications service sector sets 96U(E)(1)(1)-96U(E)(3)(2) to respective extender distribution modules 104(1)-104(6). The extender distribution modules 104(1)-104(6) provide the extended uplink communications service sector sets 96U(E)(1)(1)-96U(E)(3)(2) to the extender splitters 102(1)-102(3), which are also configured as extender combiners in this embodiment to combine the received extended uplink communications service sector sets 96U(E)(1)(1)-96U(E)(3)(2) into uplink communications service sector sets 96U(1)-96U(3).

With continuing reference to FIG. 5, the radio distribution modules 94(1)(1)-94(1)-(3) in the first programmable switch 90(1) are configured to receive the uplink communications service sector sets 96U(1)-96U(3). The first programmable switching matrix 92(1) is configured to receive the uplink communications service sector sets 96U(1)-96U(3) from the radio distribution modules 94(1)(1)-94(1)(3). The first programmable switching matrix 92(1) is also configured to switch the received uplink communications service sector sets 96U(1)-96U(3) into uplink communications signals 84U, based on the programmable configuration for the first programmable switching matrix 92(1). The uplink communications signals 84U can be distributed to the base stations 86(1)-86(4).

Figure 9:
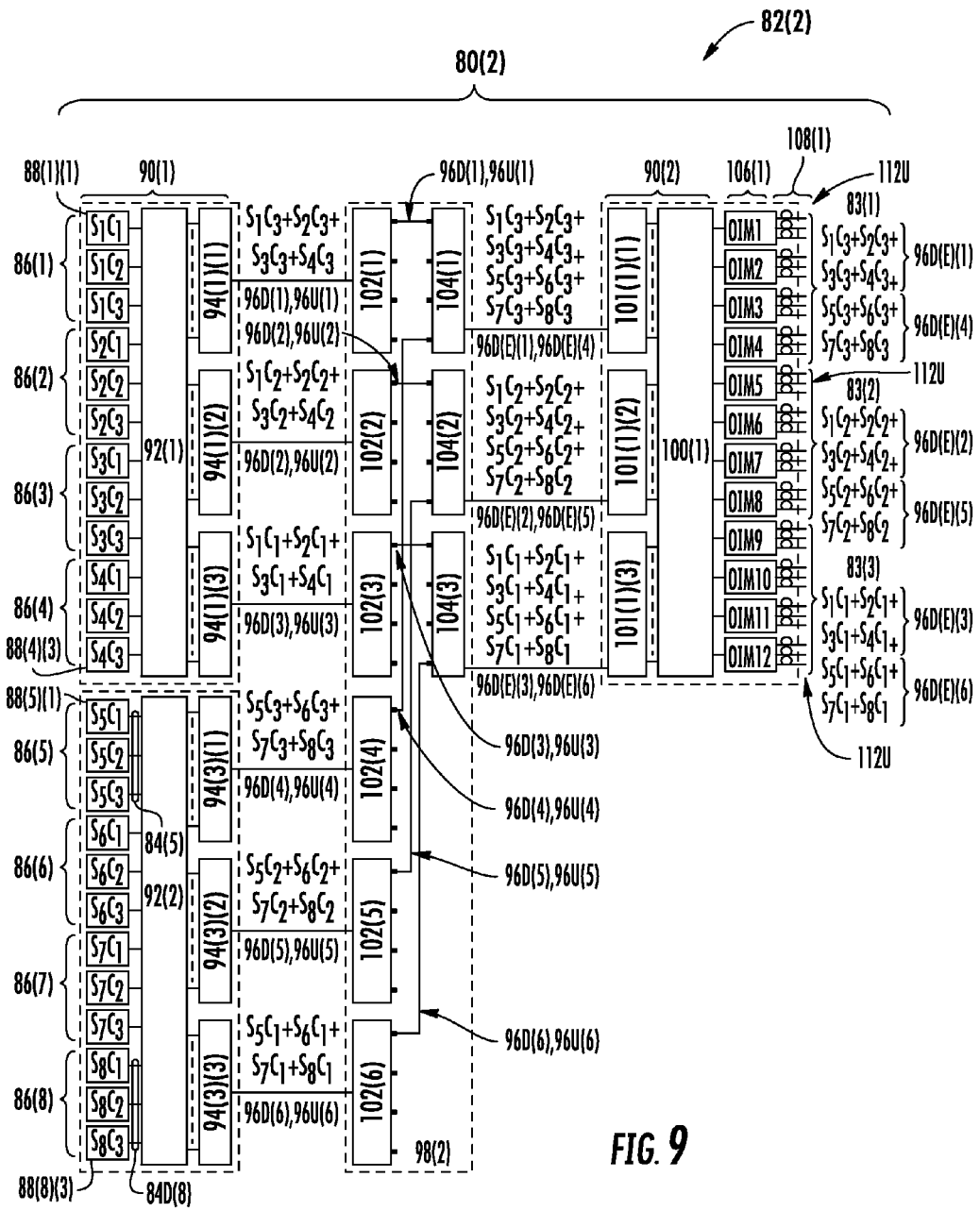
FIG. 9 is a logical diagram of a DAS with an additional first programmable switching matrix configured to divide additional received communications services into additional different communications service sector sets to provide expanded communications service sector sets, and an additional extender module configured to route the expanded communications service sector sets to the second programmable switching matrix configured to distribute the expanded communications service sector sets to the remote communications service sector areas.

Other configurations of a DAS supporting expanded, programmable communications services distribution to remote communications service sector areas can also be provided. For example, FIG. 9 is a logical diagram of the DAS 82(2) similar to the DAS 82(1) in FIG. 5. However, an additional first programmable switching matrix 92(2) is provided in the DAS 82(2). The additional first programmable switching matrix 92(2) allows the DAS 82(2) to receive additional downlink communications signals 84D(5)-84D(8) from additional base stations 86(5)-86(8) that each also comprise three (3) RIMs 88(5)(1)-88(8)(3) for total of twenty-four (24) RIMs 88. Thus, with three sectors for each base station 86(1)-86(8), up to twenty-four (24) downlink communications signals 84D can be received by the DAS 82(2). Other components in the DAS 82(2) that are the same as provided in the DAS 82(1) in FIG. 5 are illustrated in FIG. 9 with common element numbers with FIG. 5, and thus will not be re-described.

With continuing reference to FIG. 9, three additional radio distribution modules 94(3)(1)-94(3)(3) are provided for a total of six (6) radio distribution modules 94(1)(1)-94(3)(3). Thus, up to six (6) different unique combinations of the downlink communications signals 84D(1)-84D(8) may be provided as up to six (6) downlink communications sector service sets 96D(1)-96D(6). As previously discussed and illustrated in FIG. 9, the extender module 98(2) is shown in logical form and is configured to provide the six (6) downlink communications sector service sets 96D(1)-96D(6) as extended downlink communications sector service sets 96D(E)(1)-96D(E)(6). The extended downlink communications sector service sets 96D(E)(1)-96D(E)(6) can be distributed to the remote communications service areas 83(1)-83(3). In this example, the second programmable switch 90(2) only includes one (1) second programmable switching matrix 100(1). Thus, the extended remote communications service areas 83E(1)-83E(3) provided in the DAS 82(1) in FIG. 5 are not provided in the DAS 82(2) in FIG. 9. Thus, in summary, in the DAS 82(2) in FIG. 9, the number of extended downlink communications sector service sets 96D(E)(1)-96D(E)(6) is up to twice as many as provided in the DAS 82(1) in FIG. 5, but the number of remote communication service areas is half as many as provided as provided in the DAS 82(1) in FIG. 5.

With continuing reference to FIG. 9, the first and second programmable switching matrices 92(1), 92(2) and 100(1) in the DAS 82(2) in this example, are programmed such that extended distributed downlink communications sector service sets 96D(E)(1) and 96D(E)(4) are distributed to remote communications service area 83(1). Extended distributed downlink communications sector service sets 96D(E)(2) and 96D(E)(5) are distributed to remote communications service area 83(2). Extended distributed downlink communications sector service sets 96D(E)(3) and 96D(E)(6) are distributed to remote communications service area 83(3). A programmable switching matrix similar to the programmable switching matrix 95 in the DAS 82(1) in FIG. 5 could also be provided in the extender module 98(2) in the DAS 82(2) in FIG. 9.

Figure 10:
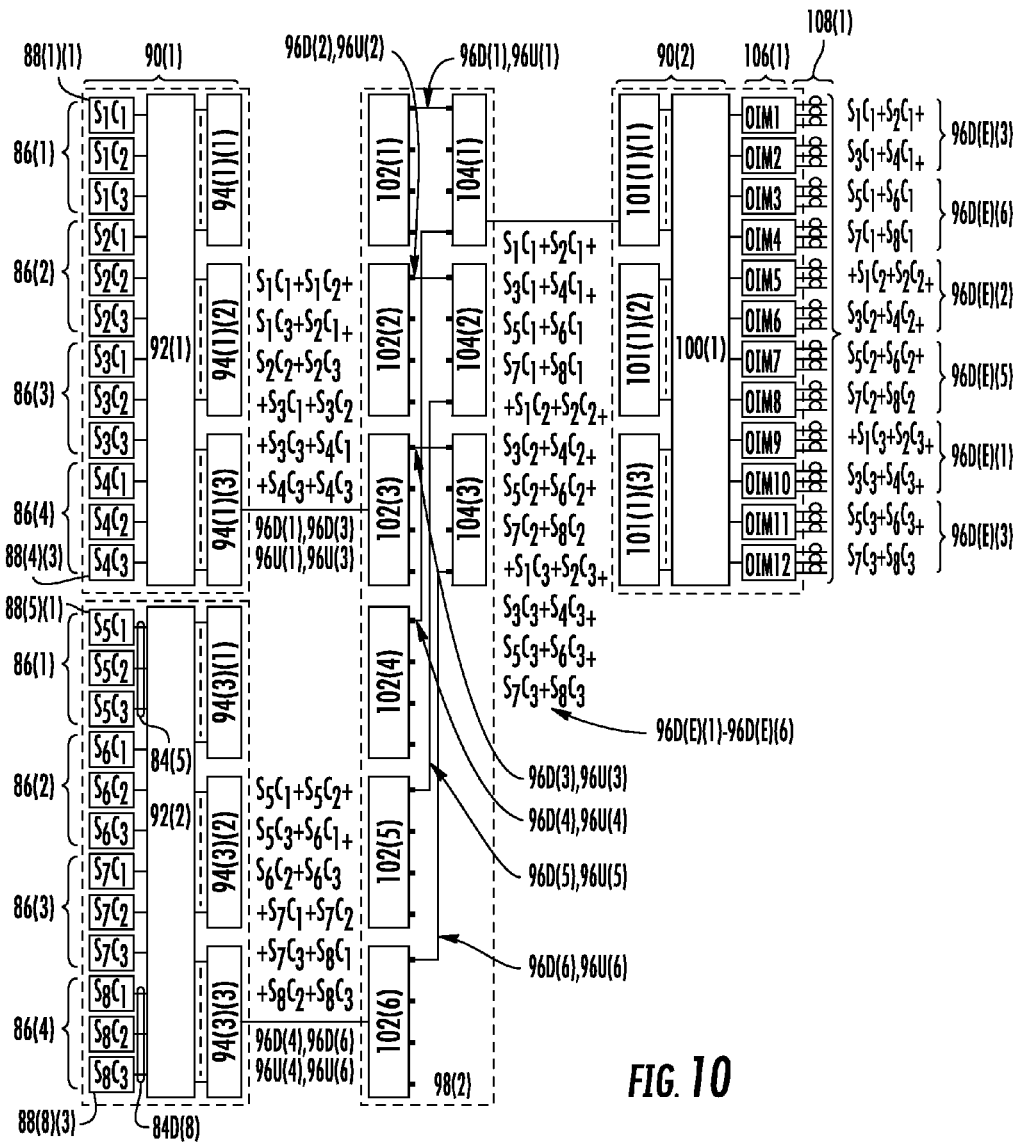
FIG. 10 is a logical diagram of the DAS in FIG. 9, configured differently, wherein the extender module is shown routing communications service sector sets provided from both first programmable switching matrices to the same remote communications service sector areas.

The communications service sector configuration provided in the DAS 82(2) in FIG. 9 can be altered by programming the first and second programmable switches 90(1), 90(2) to the desired configuration. For example, FIG. 10 also shows the DAS 82(2) in FIG. 8, but configured such that three downlink communications service sector sets 96D(1)-96D(3) and three downlink communications service sector sets 96D(4)-96D(6) are provided to one respective radio distribution module 94(1)(3) and 94(2)(3) in the first programmable switch 90(1). The downlink communications service sector sets 96D(1)-96D(3) are provided to the extender module 98(2) and combined in extender distribution module 104(1) to provide all downlink extended communications service sector sets 96D(E)(1)-96D(E)(6) to radio distribution module 103(1) in the second programmable switch 90(2). Thus, all downlink communications service sector sets 96D(1)-96D(6) can be provided to all remote communications service areas 83(1)-83(3) configured as a single sector.

Figure 11:
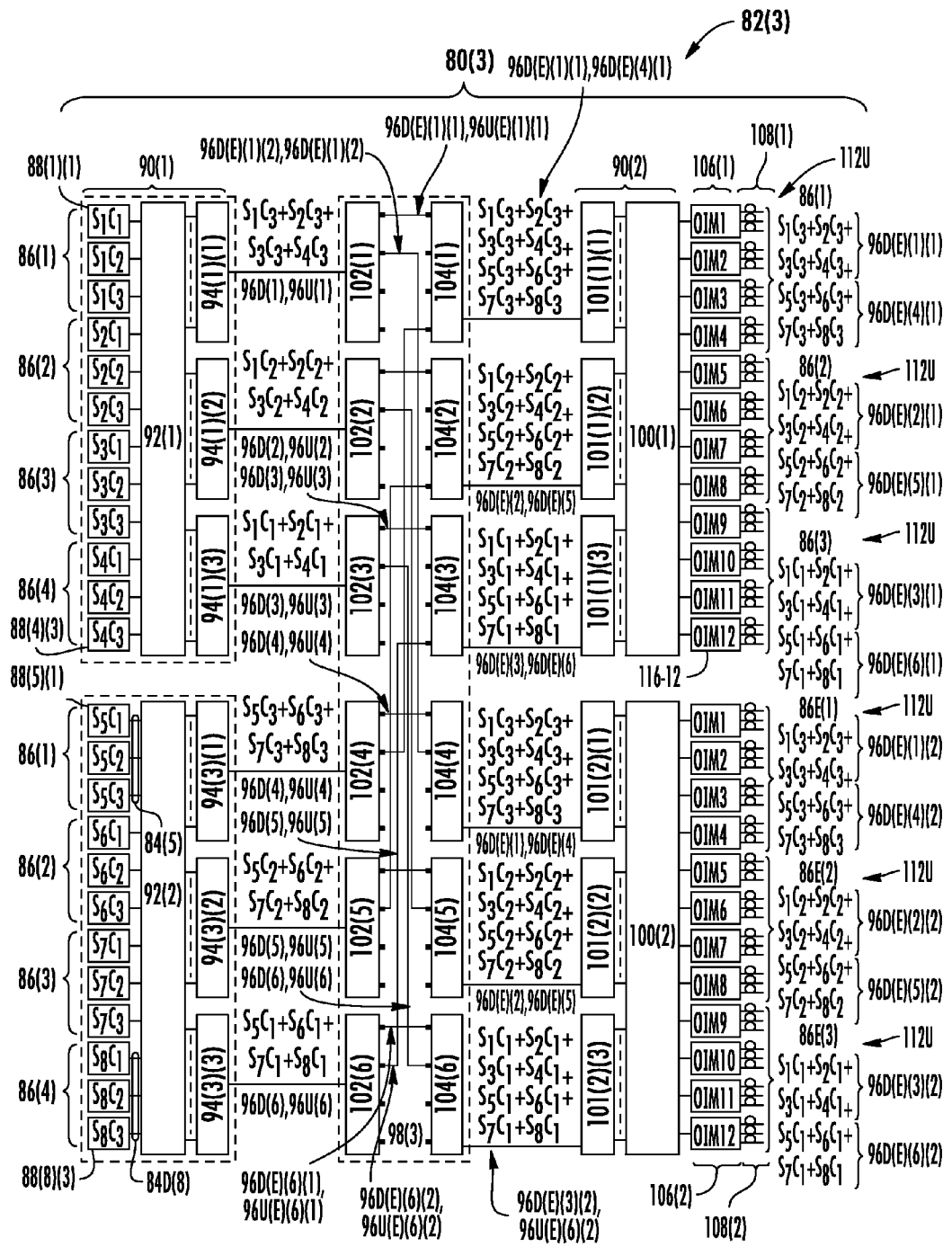
FIG. 11 is a logical diagram of a DAS with the additional second programmable switching matrix in FIG. 5, the additional first programmable switching matrix in FIG. 9, and an extender module configured to route the expanded communications service sector sets provided by the first programmable switching matrices to the second programmable switching matrices configured to distribute the expanded communications service sector sets to the expanded additional remote antenna unit groupings to form expanded remote communications service sector areas.

FIG. 11 is a logical diagram of another DAS 82(3) that contains features contained in both the DAS 82(1) in FIG. 5, and the DAS 82(2) in FIG. 9. In the DAS 82(3) in FIG. 11, the first programmable switch 90(1) contains the two (2) first programmable switching matrices 92(1), 92(2) as provided in the DAS 82(2) in FIG. 9. Also, in the DAS 82(3) in FIG. 11, the second programmable switch 90(2) contains the two (2) second programmable switching matrices 100(1), 100(2) as provided in the DAS 82(1) in FIG. 5. Thus, in the DAS 82(3) in FIG. 11, six (6) downlink extended communications service sector sets 96D(E)(1)-96D(E)(6) that can each contain all or a subset of the downlink communications signals 84D(1)-84D(8), can be distributed in up to six (6) unique sectors to the remote communications service areas 83(1)-83(3) and extended remote communications service areas 83E(1)-83E(3). A programmable switching matrix similar to the programmable switching matrix 95 in the DAS 82(1) in FIG. 5 could also be provided in the extender module 98(3) in the DAS 82(3) in FIG. 11.

Figure 12:
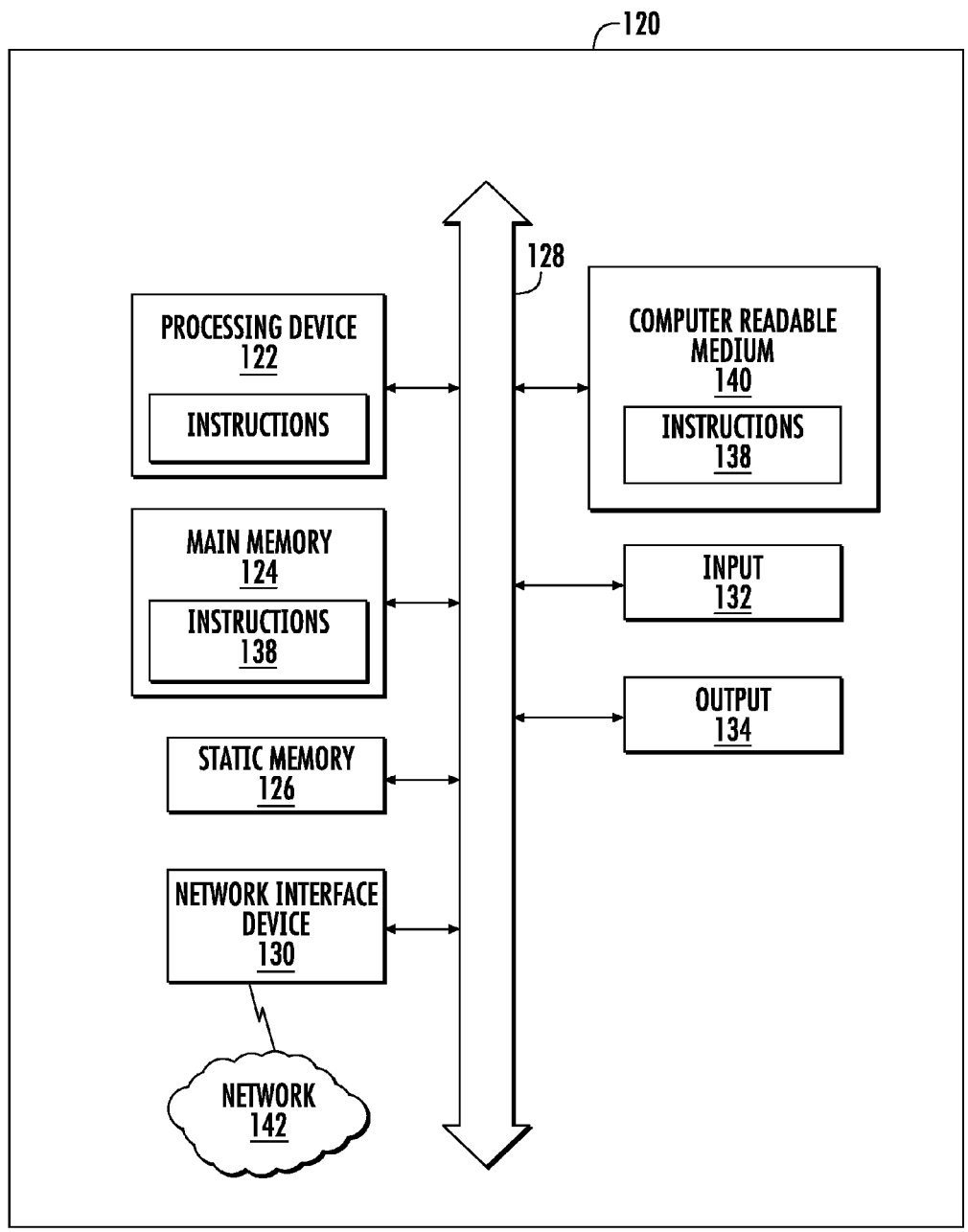
FIG. 12 is a schematic diagram of a generalized representation of an exemplary controller that can be included in any central unit, remote units, wireless client devices, and/or any other components of a DAS to provide control of the signal generation modules disclosed herein to provide for reference signal generation redundancy, wherein the exemplary computer system is adapted to execute instructions from an exemplary computer readable medium.

FIG. 12 is a schematic diagram representation of additional detail illustrating a computer system 120 that could be employed in the programmable switches 90 disclosed that are programmable to control providing the desired combination of communications service sector sets 96 and extended communications service sector sets 96D(E) from any number of different base stations to be distributed to any combination of desired remote communications service sector areas 83, based on capacity needs and capability of the DAS. The control system 120 is adapted to execute instructions from an exemplary computer-readable medium to perform these and/or any of the functions or processing described herein.

In this regard, the computer system 120 in FIG. 12 may include a set of instructions that may be executed to program the desired combination of communications service sector sets 96 and extended communications service sector sets 96D(E) to be distributed to any combination of desired remote communications service sector areas 83, based on capacity needs and capability of the DAS. The computer system 120 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 120 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 120 in this embodiment includes a processing device or processor 122, a main memory 124 (e.g., read-only memory (ROM), flash memory, dynamic random access memory (DRAM), such as synchronous DRAM (SDRAM), etc.), and a static memory 126 (e.g., flash memory, static random access memory (SRAM), etc.), which may communicate with each other via a data bus 128. Alternatively, the processor 122 may be connected to the main memory 124 and/or static memory 126 directly or via some other connectivity means. The processor 122 may be a controller, and the main memory 124 or static memory 126 may be any type of memory.

The processor 122 represents one or more general-purpose processing devices, such as a microprocessor, central processing unit, or the like. More particularly, the processor 122 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 122 is configured to execute processing logic in instructions for performing the operations and steps discussed herein.

The computer system 120 may further include a network interface device 130. The computer system 120 also may or may not include an input 132, configured to receive input and selections to be communicated to the computer system 120 when executing instructions. The computer system 120 also may or may not include an output 134, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 120 may or may not include a data storage device that includes instructions 138 stored in a computer-readable medium 140. The instructions 138 may also reside, completely or at least partially, within the main memory 124 and/or within the processor 122 during execution thereof by the computer system 120, the main memory 124 and the processor 122 also constituting computer-readable medium. The instructions 138 may further be transmitted or received over a network 142 via the network interface device 130.

While the computer-readable medium 140 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A communication system supporting expanded, programmable communications services distribution to remote communications service sector areas, comprising:
    a central unit configured to distribute downlink communications signals to a plurality of remote antenna units over at least one communications medium; and
    each of the plurality of remote antenna units configured to receive downlink communications signals from the central unit over the at least one communications medium, each of the plurality of remote antenna units comprising at least one antenna configured to wirelessly distribute the received downlink communications signals;
    the central unit, configured to:
        receive a downlink communications signal among a plurality of downlink communications signals, for a communications service among one or more communications services from at least one base station; and
    the central unit comprising at least one first programmable switch configured to:
        receive the plurality of downlink communications signals; and
        switch the plurality of downlink communications signals into one or more downlink communications service sector sets, based on a first programmable configuration for the at least one first programmable switch;
    an extender module configured to:
        receive the one or more downlink communications service sector sets; and
        extend the received one or more downlink communications service sector sets into one or more extended downlink communications service sector sets based on a configuration of the extender module; and
    at least one second programmable switch configured to:
        receive the one or more extended downlink communications service sector sets; and
        switch the received one or more extended downlink communications service sector sets into one or more remote communications service areas each comprised of a subset of the plurality of remote antenna units, based on a second programmable configuration for the at least one second programmable switch,
    wherein each of the at least one first programmable switch comprises:
        a first programmable switching matrix configured to:
            receive the plurality of downlink communications signals; and
            switch a selected set of the plurality of downlink communications signals, based on the first programmable configuration for the first programmable switching matrix; and at least one first radio distribution module configured to:
   receive the selected set of the plurality of downlink communications signals; and
   combine the received selected set of the plurality of downlink communications signals to provide a communications service sector set among the one or more downlink communications service sector sets.

2. The communication system of claim 1, wherein each of the at least one second programmable switch comprises:
   at least one second radio distribution module configured to:
      receive at least one extended downlink communications service sector set among the one or more extended downlink communications service sector sets from the extender module; and
      distribute the received at least one extended downlink communications service sector set;
   a second programmable switching matrix configured to:
      receive the at least one extended downlink communications service sector set from the at least one second radio distribution module; and
      switch the received at least one extended downlink communications service sector set into the one or more remote communications service areas, based on the second programmable configuration for the second programmable switching matrix.

3. The communication system of claim 2, wherein the second programmable switching matrix is configured to set the number of one or more of remote communications service areas up to the number of the at least one second radio distribution module based on the second programmable configuration for the second programmable switching matrix.

4. The communication system of claim 1, wherein the extender module further comprises at least one extender splitter configured to extend the received one or more downlink communications service sector sets by being configured to split the received one or more downlink communications service sector sets into a plurality of the extended downlink communications service sector sets based on the configuration of the extender module.

5. The communication system of claim 4, wherein:
   the at least one first programmable switch is further comprised of a first programmable switch; and
   the at least one extender splitter is configured to split the received one or more downlink communications service sector sets from the first programmable switch into the plurality of the extended downlink communications service sector sets, based on the configuration of the extender module.

6. The communication system of claim 5, wherein:
   the at least one second programmable switch is further comprised of a plurality of second programmable switches; and
   the at least one extender splitter is further configured to distribute the plurality of the extended downlink communications service sector sets based on the configuration of the extender module to the plurality of second programmable switches, based on the configuration of the extender module.

7. A communication system supporting expanded, programmable communications services distribution to remote communications service sector areas, comprising:

a central unit configured to distribute downlink communications signals to a plurality of remote antenna units over at least one communications medium; and
each of the plurality of remote antenna units configured to receive downlink communications signals from the central unit over the at least one communications medium, each of the plurality of remote antenna units comprising at least one antenna configured to wirelessly distribute the received downlink communications signals;
the central unit, configured to:
   receive a downlink communications signal among a plurality of downlink communications signals, for a communications service among one or more communications services from at least one base station; and
   the central unit comprising at least one first programmable switch configured to:
      receive the plurality of downlink communications signals; and
      switch the plurality of downlink communications signals into one or more downlink communications service sector sets, based on a first programmable configuration for the at least one first programmable switch;
   an extender module configured to:
      receive the one or more downlink communications service sector sets; and
      extend the received one or more downlink communications service sector sets into one or more extended downlink communications service sector sets based on a configuration of the extender module; and
   at least one second programmable switch configured to:
      receive the one or more extended downlink communications service sector sets; and
      switch the received one or more extended downlink communications service sector sets into one or more remote communications service areas each comprised of a subset of the plurality of remote antenna units, based on a second programmable configuration for the at least one second programmable switch,
   wherein the extender module further comprises at least one extender combiner configured to extend the received one or more downlink communications service sector sets by being configured to combine the received one or more downlink communications service sector sets into the one or more extended downlink communications service sector sets based on the configuration of the extender module.

8. The communication system of claim 7, wherein:
   the at least one first programmable switch is further comprised of a plurality of first programmable switches; and
   the at least one extender combiner is configured to combine the received one or more downlink communications service sector sets from the plurality of first programmable switches into a plurality of the extended downlink communications service sector sets, based on the configuration of the extender module.

9. The communication system of claim 8, wherein the plurality of first programmable switches are physically disposed in a respective radio interface module (RIM).

10. The communication system of claim 8, wherein:
   the at least one second programmable switch is further comprised of a second programmable switch; and the at least one extender combiner is further configured to distribute the plurality of the extended downlink communications service sector sets based on the configuration of the extender module to the second programmable switch, based on the configuration of the extender module.

11. A communication system supporting expanded, programmable communications services distribution to remote communications service sector areas, comprising:
a central unit configured to distribute downlink communications signals to a plurality of remote antenna units over at least one communications medium; and
each of the plurality of remote antenna units configured to receive downlink communications signals from the central unit over the at least one communications medium, each of the plurality of remote antenna units comprising at least one antenna configured to wirelessly distribute the received downlink communications signals;
the central unit, configured to:
receive a downlink communications signal among a plurality of downlink communications signals, for a communications service among one or more communications services from at least one base station; and
the central unit comprising at least one first programmable switch configured to:
receive the plurality of downlink communications signals; and
switch the plurality of downlink communications signals into one or more downlink communications service sector sets, based on a first programmable configuration for the at least one first programmable switch;
an extender module configured to:
receive the one or more downlink communications service sector sets; and
extend the received one or more downlink communications service sector sets into one or more extended downlink communications service sector sets based on a configuration of the extender module; and
at least one second programmable switch configured to:
receive the one or more extended downlink communications service sector sets; and
switch the received one or more extended downlink communications service sector sets into one or more remote communications service areas each comprised of a subset of the plurality of remote antenna units, based on a second programmable configuration for the at least one second programmable switch,
wherein the extender module comprises:
at least one extender splitter configured to extend the received one or more downlink communications service sector sets by being configured to split the received one or more downlink communications service sector sets into a plurality of the extended downlink communications service sector sets based on the configuration of the extender module; and
at least one extender combiner further configured to extend the received one or more downlink communications service sector sets by being configured to combine the received one or more downlink communications service sector sets into the one or more extended downlink communications service sector sets based on the configuration of the extender module.

12. A communication system supporting expanded, programmable communications services distribution to remote communications service sector areas, comprising:
a central unit configured to distribute downlink communications signals to a plurality of remote antenna units over at least one communications medium; and
each of the plurality of remote antenna units configured to receive downlink communications signals from the central unit over the at least one communications medium, each of the plurality of remote antenna units comprising at least one antenna configured to wirelessly distribute the received downlink communications signals;
the central unit, configured to:
receive a downlink communications signal among a plurality of downlink communications signals, for a communications service among one or more communications services from at least one base station; and
the central unit comprising at least one first programmable switch configured to:
receive the plurality of downlink communications signals; and
switch the plurality of downlink communications signals into one or more downlink communications service sector sets, based on a first programmable configuration for the at least one first programmable switch;
an extender module configured to:
receive the one or more downlink communications service sector sets; and
extend the received one or more downlink communications service sector sets into one or more extended downlink communications service sector sets based on a configuration of the extender module; and
at least one second programmable switch configured to:
receive the one or more extended downlink communications service sector sets; and
switch the received one or more extended downlink communications service sector sets into one or more remote communications service areas each comprised of a subset of the plurality of remote antenna units, based on a second programmable configuration for the at least one second programmable switch, wherein:
the central unit is further configured to receive an uplink communications signal among a plurality of extended uplink communications service sector sets;
the at least one second programmable switch is further configured to:
receive one or more uplink communications signals from at least one remote antenna unit among the plurality of remote antenna units; and
switch the received one or more uplink communications signals into one or more extended uplink communications service sector sets, based on the first programmable configuration for the at least one first programmable switch;
the extender module further configured to:
receive the one or more extended uplink communications service sector sets; and
combine the received one or more extended uplink communications service sector sets into one or more uplink communications service sector sets based on the configuration of the extender module; and the at least one first programmable switch is further configured to:
receive the one or more uplink communications service sector sets; and
switch the received one or more uplink communications service sector sets into at least one uplink communications signal, based on the second programmable configuration for the at least one second programmable switch.

13. The communication system of claim 12, wherein the at least one second programmable switch comprises:
a second programmable switching matrix configured to:
receive the at least one uplink communications signal; and
switch a selected set of the at least one uplink communications signal into one or more extended uplink communications service sector sets, based on the second programmable configuration for the second programmable switching matrix; and
at least one first radio distribution module configured to:
receive the one or more extended uplink communications service sector sets; and
combine the received one or more extended uplink communications service sector sets to provide the one or more uplink communications service sector sets.

14. The communication system of claim 13, wherein the at least one first programmable switch comprises:
at least one first radio distribution module configured to:
receive the one or more uplink communications service sector sets from the extender module; and
distribute the received one or more uplink communications service sector sets;
a first programmable switching matrix configured to:
receive the one or more uplink communications service sector sets from the at least one first radio distribution module; and
switch the received one or more uplink communications service sector sets into the at least one uplink communications signal, based on the first programmable configuration for the first programmable switching matrix.

15. The communication system of claim 12, wherein the extender module further comprises at least one extender combiner configured to extend the received one or more extended uplink communications service sector sets by being configured to combine the received one or more extended uplink communications service sector sets into the one or more uplink communications service sector sets based on the configuration of the extender module.

16. The communication system of claim 15, wherein:
the at least one second programmable switch is further comprised of a second programmable switch; and
the at least one extender combiner is configured to combine the received one or more extended uplink communications service sector sets from the second programmable switch into one or more uplink communications service sector sets, based on the configuration of the extender module.

17. The communication system of claim 16, wherein:
the at least one first programmable switch is further comprised of a plurality of first programmable switches; and the at least one extender combiner is further configured to distribute the one or more uplink communications service sector sets to the plurality of first programmable switches, based on the configuration of the extender module.

18. The communication system of claim 12, wherein the extender module further comprises at least one extender splitter configured to split the received one or more extended uplink communications service sector sets by being configured to split the received one or more extended uplink communications service sector sets into the one or more uplink communications service sector sets based on the configuration of the extender module.

19. The communication system of claim 18, wherein:
the at least one second programmable switch is further comprised of a plurality of second programmable switches; and
the at least one extender splitter is configured to split the received one or more extended uplink communications service sector sets from the plurality of second programmable switches into the one or more uplink communications service sector sets, based on the configuration of the extender module.

20. The communication system of claim 19, wherein the plurality of second programmable switches are physically disposed in a respective optical interface module (OIM).

21. The communication system of claim 19, wherein:
the at least one first programmable switch is further comprised of a first programmable switch; and
the at least one extender combiner is further configured to distribute the one or more extended uplink communications service sector sets to the first programmable switch, based on the configuration of the extender module.

22. A communication system supporting expanded, programmable communications services distribution to remote communications service sector areas, comprising:
a central unit configured to distribute downlink communications signals to a plurality of remote antenna units over at least one communications medium; and
each of the plurality of remote antenna units configured to receive downlink communications signals from the central unit over the at least one communications medium, each of the plurality of remote antenna units comprising at least one antenna configured to wirelessly distribute the received downlink communications signals;
the central unit, configured to:
receive a downlink communications signal among a plurality of downlink communications signals, for a communications service among one or more communications services from at least one base station; and
the central unit comprising at least one first programmable switch configured to:
receive the plurality of downlink communications signals; and
switch the plurality of downlink communications signals into one or more downlink communications service sector sets, based on a first programmable configuration for the at least one first programmable switch;
an extender module configured to:
receive the one or more downlink communications service sector sets; and
extend the received one or more downlink communications service sector sets into one or more extended downlink communications service sector sets based on a configuration of the extender module; and at least one second programmable switch configured to:
receive the one or more extended downlink communications service sector sets; and
switch the received one or more extended downlink communications service sector sets into one or more remote communications service areas each comprised of a subset of the plurality of remote antenna units, based on a second programmable configuration for the at least one second programmable switch, wherein the one or more communications services are comprised of at least one radio-frequency (RF) communications service and at least one digital data communications service.

23. A communication system supporting expanded, programmable communications services distribution to remote communications service sector areas, comprising:

a central unit configured to distribute downlink communications signals to a plurality of remote antenna units over at least one communications medium; and each of the plurality of remote antenna units configured to receive downlink communications signals from the central unit over the at least one communications medium, each of the plurality of remote antenna units comprising at least one antenna configured to wirelessly distribute the received downlink communications signals;

the central unit, configured to:
receive a downlink communications signal among a plurality of downlink communications signals, for a communications service among one or more communications services from at least one base station; and the central unit comprising at least one first programmable switch configured to:
receive the plurality of downlink communications signals; and
switch the plurality of downlink communications signals into one or more downlink communications service sector sets, based on a first programmable configuration for the at least one first programmable switch;

an extender module configured to:
receive the one or more downlink communications service sector sets; and
extend the received one or more downlink communications service sector sets into one or more extended downlink communications service sector sets based on a configuration of the extender module; and at least one second programmable switch configured to:
receive the one or more extended downlink communications service sector sets; and
switch the received one or more extended downlink communications service sector sets into one or more remote communications service areas each comprised of a subset of the plurality of remote antenna units, based on a second programmable configuration for the at least one second programmable switch, wherein the central unit is configured to receive the plurality of downlink communications signals from a plurality of base stations for a plurality of communications services.

24. A communication system supporting expanded, programmable communications services distribution to remote communications service sector areas, comprising:

a central unit configured to distribute downlink communications signals to a plurality of remote antenna units over at least one communications medium; and each of the plurality of remote antenna units configured to receive downlink communications signals from the central unit over the at least one communications medium, each of the plurality of remote antenna units comprising at least one antenna configured to wirelessly distribute the received downlink communications signals;

the central unit, configured to:
receive a downlink communications signal among a plurality of downlink communications signals, for a communications service among one or more communications services from at least one base station; and the central unit comprising at least one first programmable switch configured to:
receive the plurality of downlink communications signals; and
switch the plurality of downlink communications signals into one or more downlink communications service sector sets, based on a first programmable configuration for the at least one first programmable switch;

an extender module configured to:
receive the one or more downlink communications service sector sets; and
extend the received one or more downlink communications service sector sets into one or more extended downlink communications service sector sets based on a configuration of the extender module; and at least one second programmable switch configured to:
receive the one or more extended downlink communications service sector sets; and
switch the received one or more extended downlink communications service sector sets into one or more remote communications service areas each comprised of a subset of the plurality of remote antenna units, based on a second programmable configuration for the at least one second programmable switch, wherein the at least one communications medium is comprised of at least one optical fiber.

25. The communication system of claim 4, wherein the extender module is disposed between a head-end unit (HEU) of the central unit, and an optical interface unit (OIU) of the central unit.

26. The communication system of claim 7, wherein the extender module further comprises a programmable switching matrix configured to programmably distribute any of the plurality of the extended downlink communications service sector sets from the at least one extender splitter to the at least one extender combiner.

* * * * *